(12) United States Patent
Abdelghaffar et al.

(10) Patent No.: US 11,968,724 B2
(45) Date of Patent: Apr. 23, 2024

(54) TRANSMISSION CONFIGURATION INDICATOR STATE DETERMINATION FOR SINGLE FREQUENCY NETWORK PHYSICAL DOWNLINK CONTROL CHANNEL

(71) Applicant: QUALCOMM Incorporated, San Diego, CA (US)

(72) Inventors: Muhammad Sayed Khairy Abdelghaffar, San Jose, CA (US); Mostafa Khoshnevisan, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 17/654,149

(22) Filed: Mar. 9, 2022

(65) Prior Publication Data
US 2022/0322457 A1    Oct. 6, 2022

Related U.S. Application Data

(60) Provisional application No. 63/171,399, filed on Apr. 6, 2021.

(51) Int. Cl.
*H04W 74/08* (2009.01)
*H04L 1/1607* (2023.01)
(Continued)

(52) U.S. Cl.
CPC ....... *H04W 74/0841* (2013.01); *H04L 1/1642* (2013.01); *H04W 24/08* (2013.01); *H04W 74/006* (2013.01); *H04W 74/0866* (2013.01)

(58) Field of Classification Search
CPC ....... H04L 1/1642; H04L 1/08; H04L 5/0023; H04L 5/0053; H04W 24/08;
(Continued)

(56) References Cited

U.S. PATENT DOCUMENTS

2016/0270071 A1*  9/2016  Dinan ................... H04L 1/1854
2021/0235455 A1*  7/2021  Khoshnevisan ...... H04W 80/02
(Continued)

FOREIGN PATENT DOCUMENTS

| EP | 3917055 A1 | 12/2021 |
| WO | WO-2020164369 A1 | 8/2020 |
| WO | WO-2021050281 A1 | 3/2021 |

OTHER PUBLICATIONS

R1-1809711—3GPP TSG-RAN WG1 Meeting #94 Beam management for NR. Qualcomm Incorporated. Gothenburg, Sweden Aug. 20-24, 2018.*

(Continued)

*Primary Examiner* — Stephen J Clawson
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a configuration of a control resource set (CORESET), wherein the configuration includes an indication that the CORESET is a single frequency network (SFN) CORESET. The UE may determine one or more transmission configuration indicator (TCI) states for monitoring the SFN CORESET based at least in part on a determination that the UE has not received an activation command that indicates multiple TCI states to be activated. The UE may receive a physical downlink control channel (PDCCH) communication using the one or more TCI states determined for monitoring the SFN CORESET. Numerous other aspects are described.

28 Claims, 14 Drawing Sheets

(51) Int. Cl.
*H04W 24/08* (2009.01)
*H04W 74/00* (2009.01)
*H04W 74/0833* (2024.01)

(58) Field of Classification Search
CPC ........... H04W 74/006; H04W 74/0841; H04W 74/0833; H04W 72/23; H04B 7/0695; H04B 7/088
See application file for complete search history.

(56) References Cited

U.S. PATENT DOCUMENTS

| | | | | |
|---|---|---|---|---|
| 2021/0329512 | A1* | 10/2021 | Jassal | H04W 36/0058 |
| 2022/0116981 | A1* | 4/2022 | Saber | H04L 1/08 |
| 2022/0167324 | A1* | 5/2022 | Baskaran | H04L 5/0023 |
| 2023/0047603 | A1* | 2/2023 | Kim | H04L 5/0051 |
| 2023/0050015 | A1* | 2/2023 | Kang | H04L 5/0048 |
| 2023/0064231 | A1* | 3/2023 | Haghighat | H04W 72/23 |
| 2023/0073095 | A1* | 3/2023 | Kim | H04W 72/1273 |
| 2023/0096196 | A1* | 3/2023 | Kim | H04L 5/0053 370/329 |
| 2023/0112271 | A1* | 4/2023 | Kim | H04L 5/0053 370/329 |
| 2023/0126574 | A1* | 4/2023 | Ji | H04L 5/00 370/329 |
| 2023/0239823 | A1* | 7/2023 | Liu | H04W 56/0045 370/350 |

OTHER PUBLICATIONS

International Search Report and Written Opinion—PCT/US2022/071069—ISA/EPO—dated Aug. 22, 2022.
Nokia., et al., "Enhancements for HST-SFN Deployment", 3GPP TSG RAN WG1 #104-e Meeting, R1-2101009, 3GPP, Mobile Competence Centre, 650, Route Des Lucioles, F-06921 Sophia-Antipolis Cedex, France, vol. RAN WG1, No. e Meeting, Jan. 25, 2021-Feb. 5, 2021, Jan. 18, 2021 (Jan. 18, 2021), XP051970597, 13 Pages, Retrieved from the Internet: URL: https://ftp.3gpp.org/tsg_ran/WG1_RL1/TSGR1_104-e/Docs/R1-2101009.zip R1-2101009_M-TRP HST-SFN.docx [retrieved on Jan. 18, 2021] p. 1 p. 6.
OPPO: "Enhancements on Multi-TRP for PDCCH, PUCCH and PUSCH", 3GPP TSG RAN WG1 #103-e, R1-2008218, 3GPP, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), XP051946585, 9 Pages, Retrieved from the Internet: URL: https://ftp.3gpp.org/tsg_ran/WG1_RL1/TSGR1_103-e/Docs/R1-2008218.zip R1-2008218.docx [retrieved on Oct. 24, 2020] p. 1-p. 2.
Partial International Search Report—PCT/US2022/071069—ISA/EPO—dated Jun. 29, 2022.

* cited by examiner

TRANSMISSION CONFIGURATION INDICATOR STATE DETERMINATION FOR SINGLE FREQUENCY NETWORK PHYSICAL DOWNLINK CONTROL CHANNEL

CROSS-REFERENCE TO RELATED APPLICATION

This Patent application claims priority to U.S. Provisional Patent Application No. 63/171,399, filed on Apr. 6, 2021, entitled "TRANSMISSION CONFIGURATION INDICATOR STATE DETERMINATION FOR SINGLE FREQUENCY NETWORK PHYSICAL DOWNLINK CONTROL CHANNEL," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for transmission configuration indicator (TCI) state determination for a single frequency network (SFN) physical downlink control channel (PDCCH).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: receive, from a base station, a configuration of a control resource set (CORESET), wherein the configuration includes an indication that the CORESET is a single frequency network (SFN) CORESET; determine one or more transmission configuration indicator (TCI) states for monitoring the SFN CORESET based at least in part on a determination that the UE has not received an activation command that indicates multiple TCI states to be activated; and receive a physical downlink control channel (PDCCH) communication using the one or more TCI states determined for monitoring the SFN CORESET.

In some aspects, a UE for wireless communication includes a memory and one or more processors, coupled to the memory, configured to: receive, using a first TCI state and a second TCI state, an SFN PDCCH communication requesting a random access procedure; transmit, based at least in part on receiving the SFN PDCCH communication, a physical random access channel (PRACH) communication including a random access preamble; and receive at least one of a random access response (RAR) PDCCH communication or an RAR physical downlink shared channel (PDSCH) communication using one or more TCI states determined based at least in part on at least one of the first TCI state or the second TCI state.

In some aspects, a method of wireless communication performed by a UE includes receiving, from a base station, a configuration of a CORESET, wherein the configuration includes an indication that the CORESET is an SFN CORESET; determining one or more TCI states for monitoring the SFN CORESET based at least in part on a determination that the UE has not received an activation command that indicates multiple TCI states to be activated; and receiving a PDCCH communication using the one or more TCI states determined for monitoring the SFN CORESET.

In some aspects, a method of wireless communication performed by a UE includes receiving, using a first TCI state and a second TCI state, an SFN PDCCH communication requesting a random access procedure; transmitting, based at least in part on receiving the SFN PDCCH communication, a PRACH communication including a random access preamble; and receiving at least one of an RAR PDCCH communication or an RAR PDSCH communication using one or more TCI states determined based at least in part on at least one of the first TCI state or the second TCI state.

In some aspects, a non-transitory computer-readable medium storing a set of instructions for wireless communication includes one or more instructions that, when executed by one or more processors of a UE, cause the UE to: receive, from a base station, a configuration of a CORESET, wherein the configuration includes an indication that the CORESET is an SFN CORESET; determine one or more TCI states for monitoring the SFN CORESET based at least in part on a determination that the UE has not received an activation command that indicates multiple TCI states to be activated;

and receive a PDCCH communication using the one or more TCI states determined for monitoring the SFN CORESET.

In some aspects, a non-transitory computer-readable medium storing a set of instructions for wireless communication includes one or more instructions that, when executed by one or more processors of an UE, cause the UE to: receive, using a first TCI state and a second TCI state, an SFN PDCCH communication requesting a random access procedure; transmit, based at least in part on receiving the SFN PDCCH communication, a PRACH communication including a random access preamble; and receive at least one of an RAR PDCCH communication or an RAR PDSCH communication using one or more TCI states determined based at least in part on at least one of the first TCI state or the second TCI state.

In some aspects, an apparatus for wireless communication includes means for receiving, from a base station, a configuration of a CORESET, wherein the configuration includes an indication that the CORESET is an SFN CORESET; means for determining one or more TCI states for monitoring the SFN CORESET based at least in part on a determination that the apparatus has not received an activation command that indicates multiple TCI states to be activated; and means for receiving a PDCCH communication using the one or more TCI states determined for monitoring the SFN CORESET.

In some aspects, an apparatus for wireless communication includes means for receiving, using a first TCI state and a second TCI state, an SFN PDCCH communication requesting a random access procedure; means for transmitting, based at least in part on receiving the SFN PDCCH communication, a PRACH communication including a random access preamble; and means for receiving at least one of an RAR PDCCH communication or an RAR PDSCH communication using one or more TCI states determined based at least in part on at least one of the first TCI state or the second TCI state.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
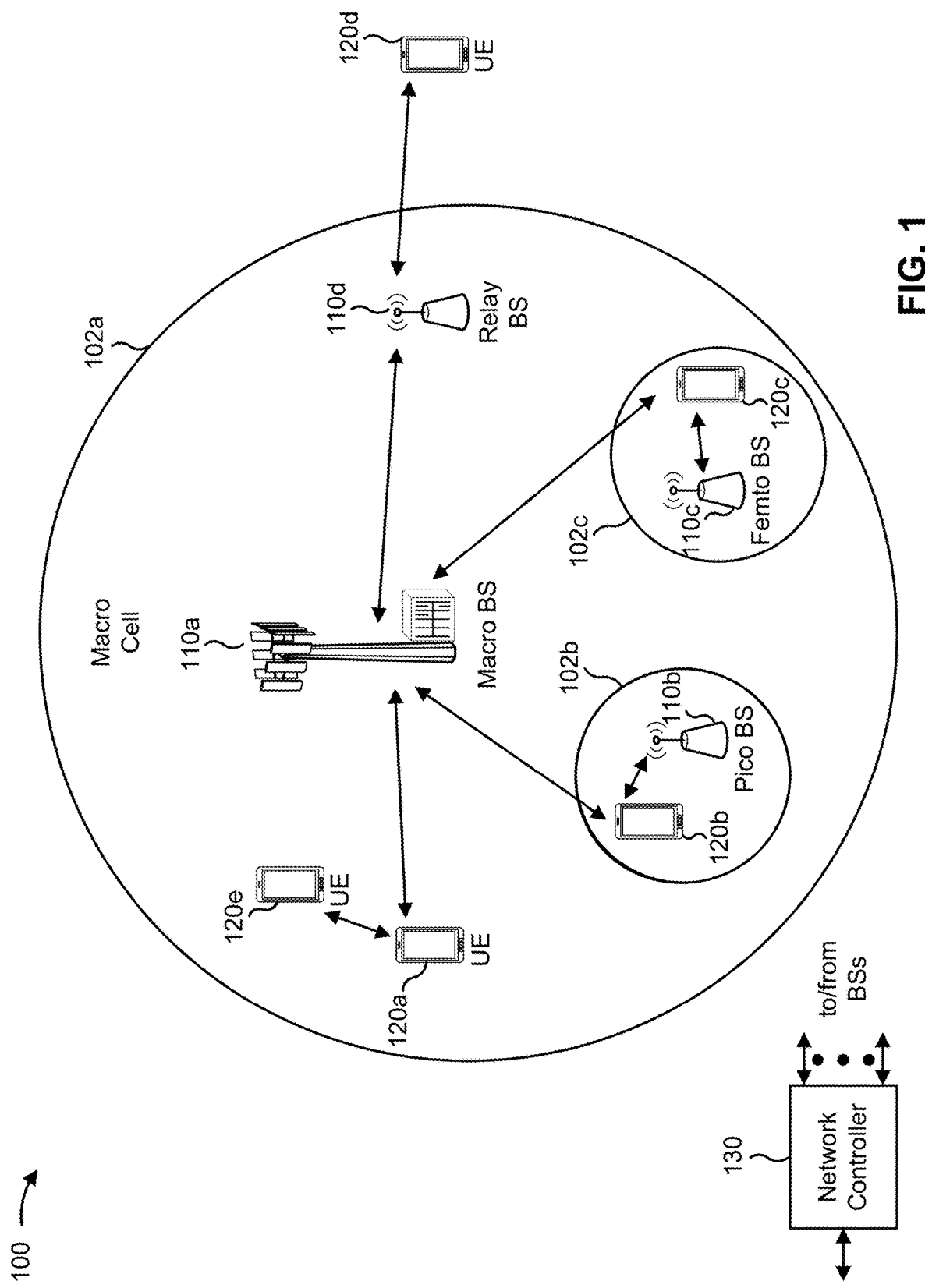
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
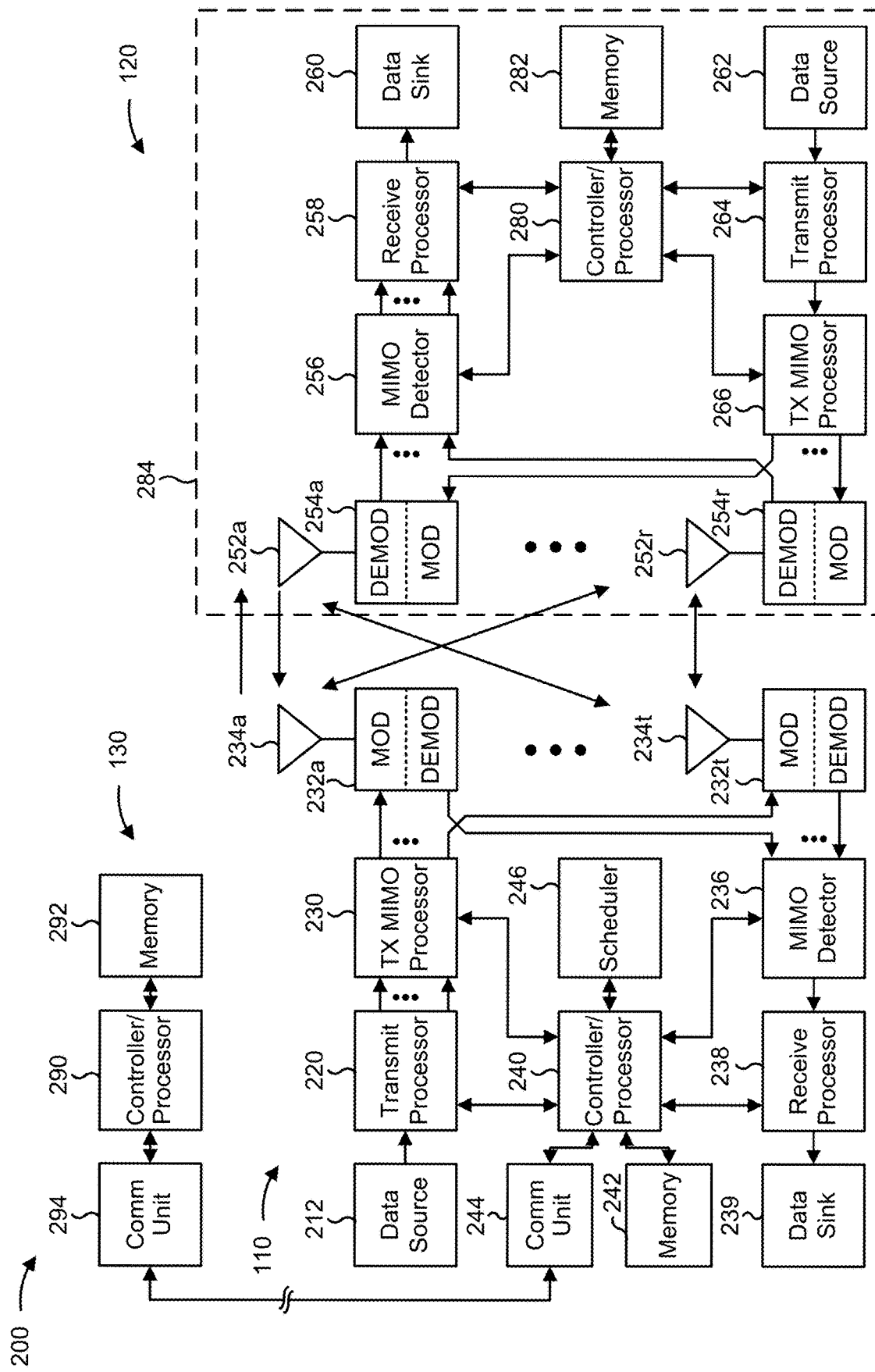
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-14).

The controller/processor 240 of the base station 110, the controller/processor 280 of the UE 120, and/or any other component(s) of FIG. 2 may perform one or more techniques associated with transmission configuration indicator (TCI) state determination for single frequency network (SFN) physical downlink control channel (PDCCH) communications, as described in more detail elsewhere herein. For example, the controller/processor 240 of the base station 110, the controller/processor 280 of the UE 120, and/or any other component(s) of FIG. 2 may perform or direct operations of, for example, process 1200 of FIG. 12, process 1300 of FIG. 13, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, the UE 120 includes means for receiving, from a base station, a configuration of a control resource set (CORESET), wherein the configuration includes an indication that the CORESET is an SFN CORESET; means for determining one or more TCI states for monitoring the SFN CORESET based at least in part on a determination that the UE has not received an activation command that indicates multiple TCI states to be activated; or means for receiving a PDCCH communication using the one or more TCI states determined for monitoring the SFN CORESET. The means for the UE 120 to perform operations described herein may include, for example, one or more of antenna 252, modem 254, MIMO detector 256, receive processor 258, transmit processor 264, TX MIMO processor 266, controller/processor 280, or memory 282.

In some aspects, the UE 120 includes means for receiving, using a first TCI state and a second TCI state, an SFN PDCCH communication requesting a random access procedure; means for transmitting, based at least in part on receiving the SFN PDCCH communication, a physical random access channel (PRACH) communication including a random access preamble; or means for receiving at least one of a random access response (RAR) PDCCH communication or an RAR physical downlink shared channel (PDSCH) communication using one or more TCI states determined based at least in part on at least one of the first TCI state or the second TCI state. The means for the UE 120 to perform operations described herein may include, for example, one or more of antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
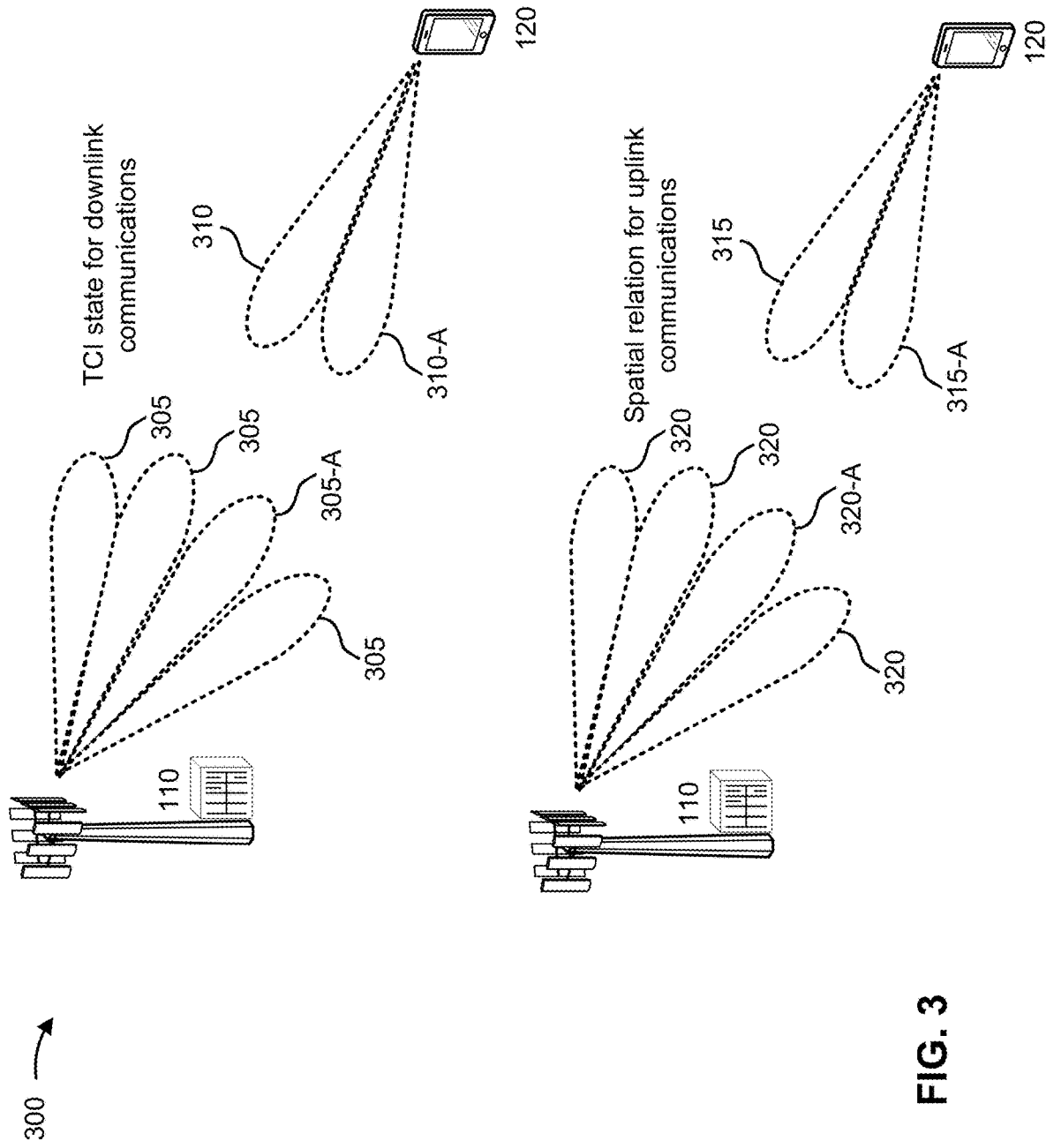
FIG. 3 is a diagram illustrating an example of using beams for communications between a base station and a UE, in accordance with the present disclosure.

FIG. 3 is a diagram illustrating an example 300 of using beams for communications between a base station and a UE, in accordance with the present disclosure. As shown in FIG. 3, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 305.

The UE 120 may attempt to receive downlink transmissions via one or more UE receive beams 310, which may be configured using different beamforming parameters at receive circuitry of the UE 120. The UE 120 may identify a particular BS transmit beam 305, shown as BS transmit beam 305-A, and a particular UE receive beam 310, shown as UE receive beam 310-A, that provide relatively favorable performance (for example, that have a best channel quality of the different measured combinations of BS transmit beams 305 and UE receive beams 310). In some examples, the UE 120 may transmit an indication of which BS transmit beam 305 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 305-A and the UE receive beam 310-A), which may be further refined and maintained in accordance with one or more established beam refinement procedures.

A downlink beam, such as a BS transmit beam 305 or a UE receive beam 310, may be associated with a TCI state. A TCI state may indicate a directionality or a characteristic of the downlink beam, such as one or more quasi co-location (QCL) properties of the downlink beam. A QCL property may include, for example, a Doppler shift, a Doppler spread, an average delay, a delay spread, or spatial receive parameters, among other examples. In some examples, each BS transmit beam 305 may be associated with a synchronization signal block (SSB), and the UE 120 may indicate a preferred BS transmit beam 305 by transmitting uplink transmissions in resources of the SSB that are associated with the preferred BS transmit beam 305. A particular SSB may have an associated TCI state (for example, for an antenna port or for beamforming). The base station 110 may, in some examples, indicate a downlink BS transmit beam 305 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 310 at the UE 120. Thus, the UE 120 may select a corresponding UE receive beam 310 from a set of BPLs based at least in part on the base station 110 indicating a BS transmit beam 305 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a PDSCH. The set of activated TCI states for downlink control channel communications may correspond to beams that the base station 110 may use for downlink transmission on a PDCCH or in a CORESET. The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 315.

The base station 110 may receive uplink transmissions via one or more BS receive beams 320. The base station 110 may identify a particular UE transmit beam 315, shown as UE transmit beam 315-A, and a particular BS receive beam 320, shown as BS receive beam 320-A, that provide relatively favorable performance (for example, that have a best channel quality of the different measured combinations of UE transmit beams 315 and BS receive beams 320). In some examples, the base station 110 may transmit an indication of which UE transmit beam 315 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 315-A and the BS receive beam 320-A), which may be further refined and maintained in accordance with one or more established beam refinement procedures. An uplink beam, such as a UE transmit beam 315 or a BS receive beam 320, may be associated with a spatial relation. A spatial relation may indicate a directionality or a characteristic of the uplink beam, similar to one or more QCL properties, as described above.

As indicated above, FIG. 3 is provided as an example. Other examples may differ from what is described with respect to FIG. 3.

Figure 4:
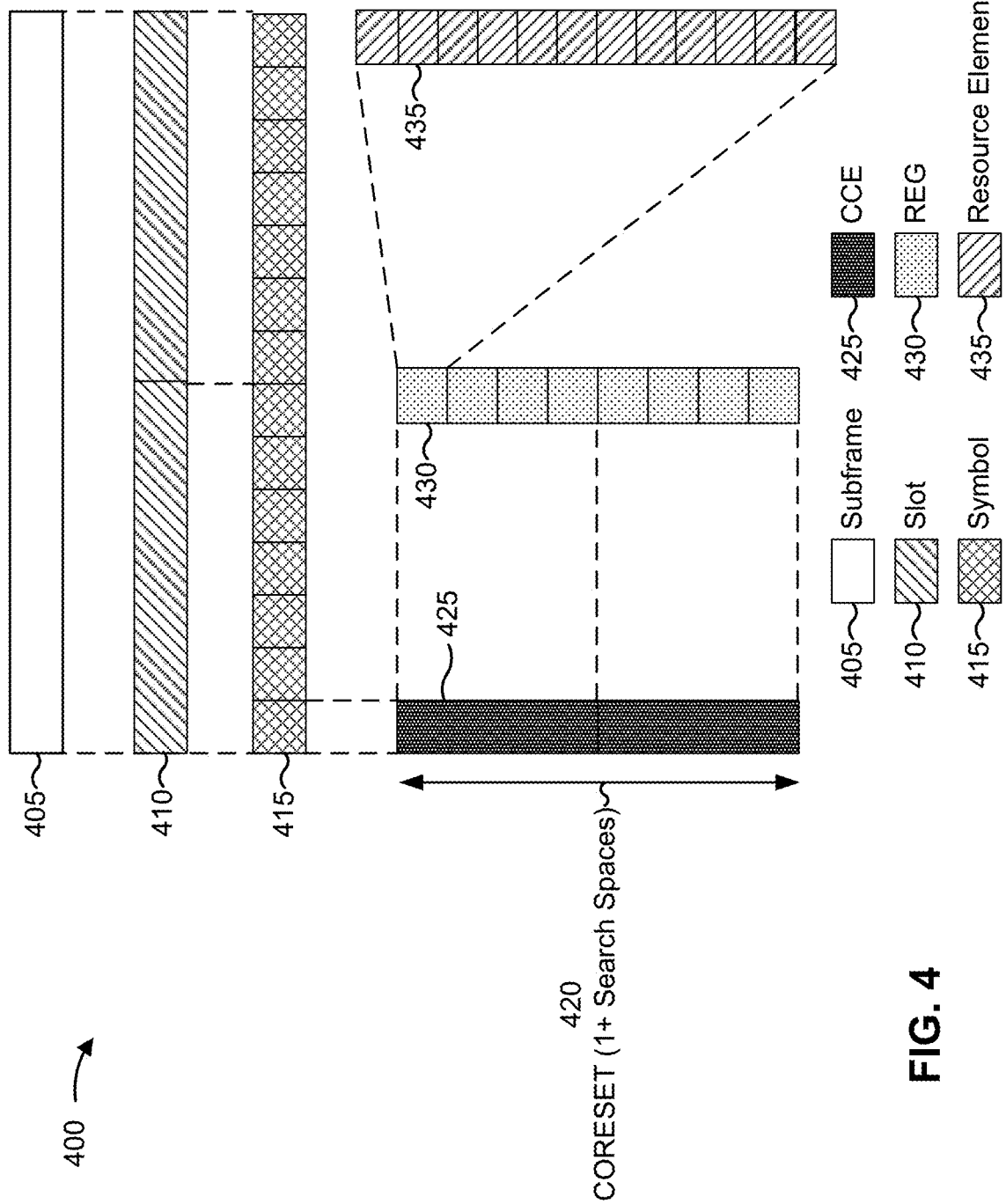
FIG. 4 is a diagram illustrating an example resource structure for wireless communication, in accordance with the present disclosure.

FIG. 4 is a diagram illustrating an example resource structure 400 for wireless communication, in accordance with the present disclosure. Resource structure 400 shows an example of various groups of resources described herein. As shown, resource structure 400 may include a subframe 405. Subframe 405 may include multiple slots 410. While resource structure 400 is shown as including 2 slots per subframe, a different number of slots may be included in a subframe (e.g., 4 slots, 8 slots, 16 slots, 32 slots, or another quantity of slots). In some aspects, different types of transmission time intervals (TTIs) may be used, other than subframes and/or slots. A slot 410 may include multiple symbols 415, such as 14 symbols per slot.

The potential control region of a slot 410 may be referred to as a CORESET 420 and may be structured to support an efficient use of resources, such as by flexible configuration or reconfiguration of resources of the CORESET 420 for one or more PDCCHs and/or one or more PDSCHs. In some aspects, the CORESET 420 may occupy the first symbol 415 of a slot 410, the first two symbols 415 of a slot 410, or the first three symbols 415 of a slot 410. Thus, a CORESET 420 may include multiple resource blocks (RBs) in the frequency domain, and either one, two, or three symbols 415 in the time domain. In 5G, a quantity of resources included in the CORESET 420 may be flexibly configured, such as by using RRC signaling to indicate a frequency domain region (e.g., a quantity of resource blocks) and/or a time domain region (e.g., a quantity of symbols) for the CORESET 420.

As illustrated, a symbol 415 that includes CORESET 420 may include one or more control channel elements (CCEs) 425, shown as two CCEs 425 as an example, that span a portion of the system bandwidth. A CCE 425 may include downlink control information (DCI) that is used to provide control information for wireless communication. A base station may transmit DCI during multiple CCEs 425 (as shown), where the quantity of CCEs 425 used for transmission of DCI represents the aggregation level (AL) used by the BS for the transmission of DCI. In FIG. 4, an AL of two is shown as an example, corresponding to two CCEs 425 in a slot 410. In some aspects, different aggregation levels may be used, such as 1, 2, 4, 8, 16, or another aggregation level.

Each CCE 425 may include a fixed quantity of resource element groups (REGs) 430, shown as 6 REGs 430, or may include a variable quantity of REGs 430. In some aspects, the quantity of REGs 430 included in a CCE 425 may be specified by a REG bundle size. A REG 430 may include one resource block, which may include 12 resource elements (REs) 435 within a symbol 415. A resource element 435 may occupy one subcarrier in the frequency domain and one OFDM symbol in the time domain.

A search space may include all possible locations (e.g., in time and/or frequency) where a PDCCH may be located. A CORESET 420 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs) and/or an aggregation level being used. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space (SS) set.

A CORESET 420 may be interleaved or non-interleaved. An interleaved CORESET 420 may have CCE-to-REG mapping such that adjacent CCEs are mapped to scattered REG bundles in the frequency domain (e.g., adjacent CCEs are not mapped to consecutive REG bundles of the CORESET 420). A non-interleaved CORESET 420 may have a CCE-to-REG mapping such that all CCEs are mapped to consecutive REG bundles (e.g., in the frequency domain) of the CORESET 420.

In some examples, a UE may be configured with multiple (e.g., up to five) CORESETs in a bandwidth part (BWP) of a component carrier serving the UE (e.g., a serving cell). Each CORESET may be associated with an active TCI state. In some examples, a UE may be configured with multiple SS sets (e.g., up to ten) in a BWP of the component carrier. Each SS set may be associated with a CORESET. As part of an SS set configuration, RRC signaling may be used to configure the associated CORESET, periodicity and offset of monitoring slots, monitoring symbols within a slot, SS set type (e.g., common SS (CSS) or UE-specific SS (USS)), DCI formats to monitor, and/or a number of PDCCH candidates for a given AL. The monitoring slot periodicity and offset, and the monitoring symbols within a slot, may determine PDCCH monitoring occasions for the UE. The UE may monitor PDCCH candidates in an SS set associated with a CORESET to determine whether DCI is received in one or more PDCCH candidates. For example, the UE may perform blind decoding on PDCCH candidates in the SS set, and one or more PDCCH candidates may be successfully decoded (e.g., a cyclic redundancy check (CRC) passes) and include decoded DCI.

A CORESET may be configured via an RRC message that includes indications of CORESET parameters. The CORE- SET parameters may indicate one or multiple configured TCI states for the CORESET. In a case in which only a single TCI state is indicated in the CORESET parameters (e.g., in a tci-StatesPDCCH parameter of a ControlResourceSet parameter set), the UE may assume a QCL relationship between the PDCCH and the SSB/CSI-RS specified by the TCI state, and use the specified TCI state (e.g., a receive beam associated with the specified TCI state) to monitor/receive PDCCH transmissions from a base station. In a case in which multiple TCI states are indicated in the CORESET parameters, the UE may receive an activation command to identify which configured TCI state to apply for monitoring/receiving PDCCH transmissions from the base station. For example, a TCI state indication in a UE-specific PDCCH medium access control (MAC) control element (MAC-CE) may be used to provide the activation command to the UE. In a case, which multiple TCI states are indicated in the CORESET parameters, but the UE does not receive an activation command, the UE may assume a QCL relationship between the PDCCH and an SSB selected during an initial access procedure. In this case, the UE may use a TCI state associated with the SSB selected during the initial access procedure to monitor/receive PDCCH transmissions.

As indicated above, FIG. 4 is provided as an example. Other examples may differ from what is described with respect to FIG. 4.

Figure 5:
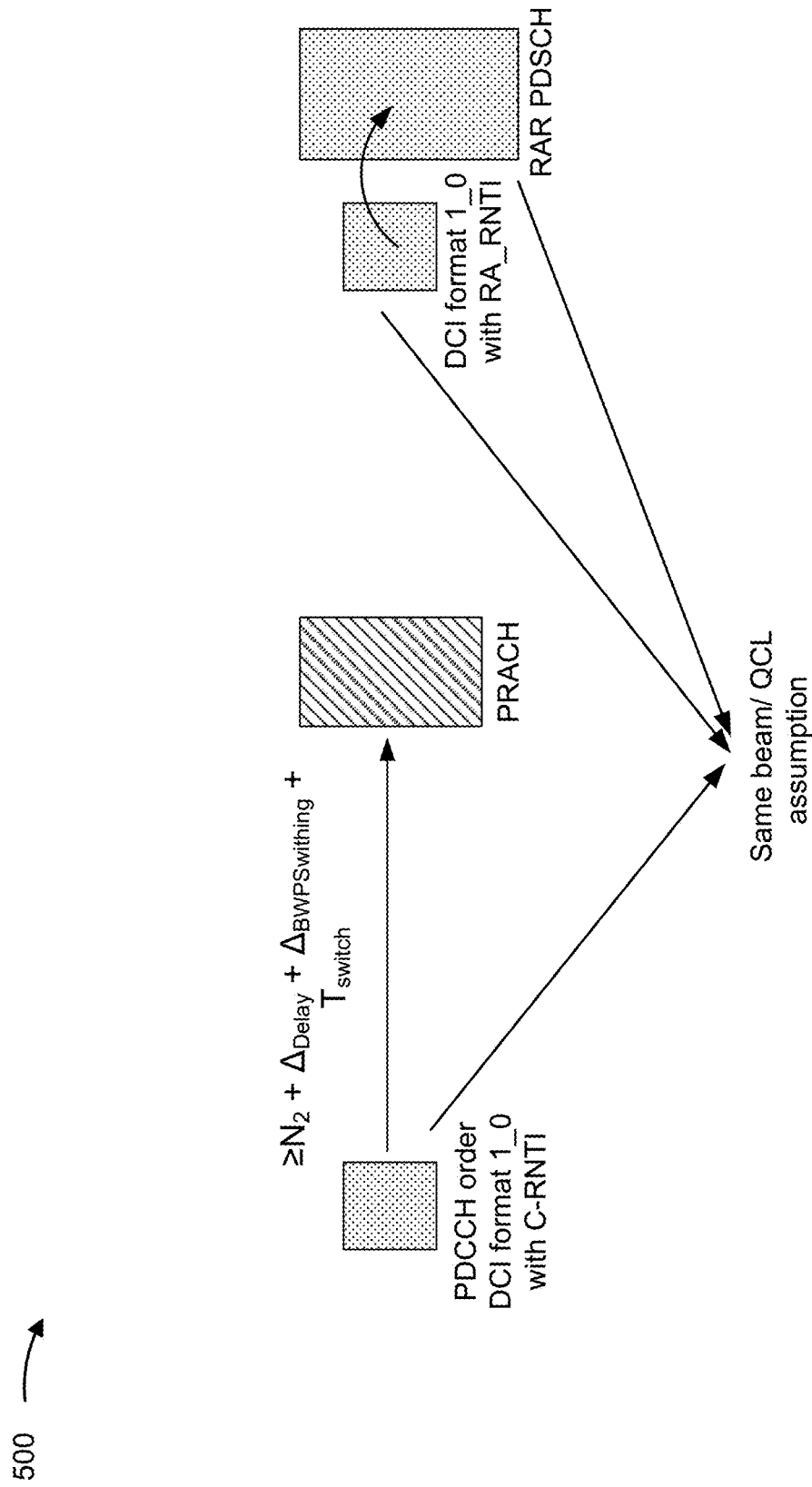
FIG. 5 is a diagram illustrating an example of a physical downlink control channel (PDCCH) order requesting a random access procedure, in accordance with the present disclosure.

FIG. 5 is a diagram illustrating an example 500 of a PDCCH order requesting a random access procedure, in accordance with the present disclosure.

As shown in FIG. 5, a base station may transmit, to a UE, a PDCCH order requesting a random access procedure. The PDCCH order may be transmitted to the UE using DCI format 1_0 with CRC scrambled with a cell radio network temporary identifier (C-RNTI). The UE may determine that the DCI corresponds to the PDCCH order requesting random access if the frequency domain resource allocation (FDRA) field of the DCI is set to all ones. In this case, the DCI may indicate a random access preamble index (e.g., 6 bits), uplink/supplementary uplink (UL/SUL) indication (e.g., 1 bit), SSB index (e.g., 4 bits), and a PRACH mask index (e.g., 4 bits). The rest of the bits in the DCI may be reserved. In a case in which the random access preamble index is 0, the PDCCH order triggers contention-based random access (CBRA), and the UE may ignore the remaining fields of the DCI. In a case in which the random access preamble index is not 0, the PDCCH order triggers contention-free random access (CFRA).

As shown in FIG. 5, the UE may transmit a PRACH transmission including the random access preamble (e.g., message 1 (Msg1) in the random access procedure) to the base station. The UE may transmit the PRACH transmission in a random access channel (RACH) occasion indicated by the SSB index (in the case of CFRA) or in a RACH occasion associated with a measured SSB (in the case of CBRA). A time between the last symbol of the PDCCH order reception and the first symbol of the PRACH transmission may be greater than or equal to $N_2 + \Delta_{Delay} + \Delta^{BWPSwitching} + T_{switch}$. $N_2$ is a physical uplink shared channel (PUSCH) preparation time for the UE (e.g., for UE processing capability 1). $\Delta_{Delay}$ is delay that is based on the frequency of the operating band. For example, $\Delta_{Delay}$ may be 0.5 ms for FR1 or 0.25 ms for FR2. $\Delta^{BWPSwitching}/T_{switch}$ are added when there is BWP switching/uplink switching between the PDCCH reception and the PRACH transmission, and otherwise, are 0.

After the PRACH transmission, the UE may monitor for a PDCCH communication with CRC scrambled by a random access radio network temporary identifier (RA-RNTI), which schedules an RAR PDSCH communication. In a case in which the random access procedure is CFRA on a primary cell (PCell) or primary secondary cell (PSCell), the UE may assume that the PDCCH communication with RA-RNTI is quasi co-located with (e.g., has the same QCL properties as) the PDCCH order. Accordingly, the UE may monitor for and receive the PDCCH communication on the same beam (e.g., a beam with the same TCI state) as the beam on which the PDCCH order was received. The UE may also assume that the RAR PDSCH communication, which is scheduled by the PDCCH communication, is quasi co-located with the PDCCH. Accordingly, the UE may receive the RAR PDSCH communication on the same beam (e.g., a beam with the same TCI state) as the beam on which the PDCCH order was received.

As indicated above, FIG. 5 is provided as an example. Other examples may differ from what is described with respect to FIG. 5.

Figure 6:
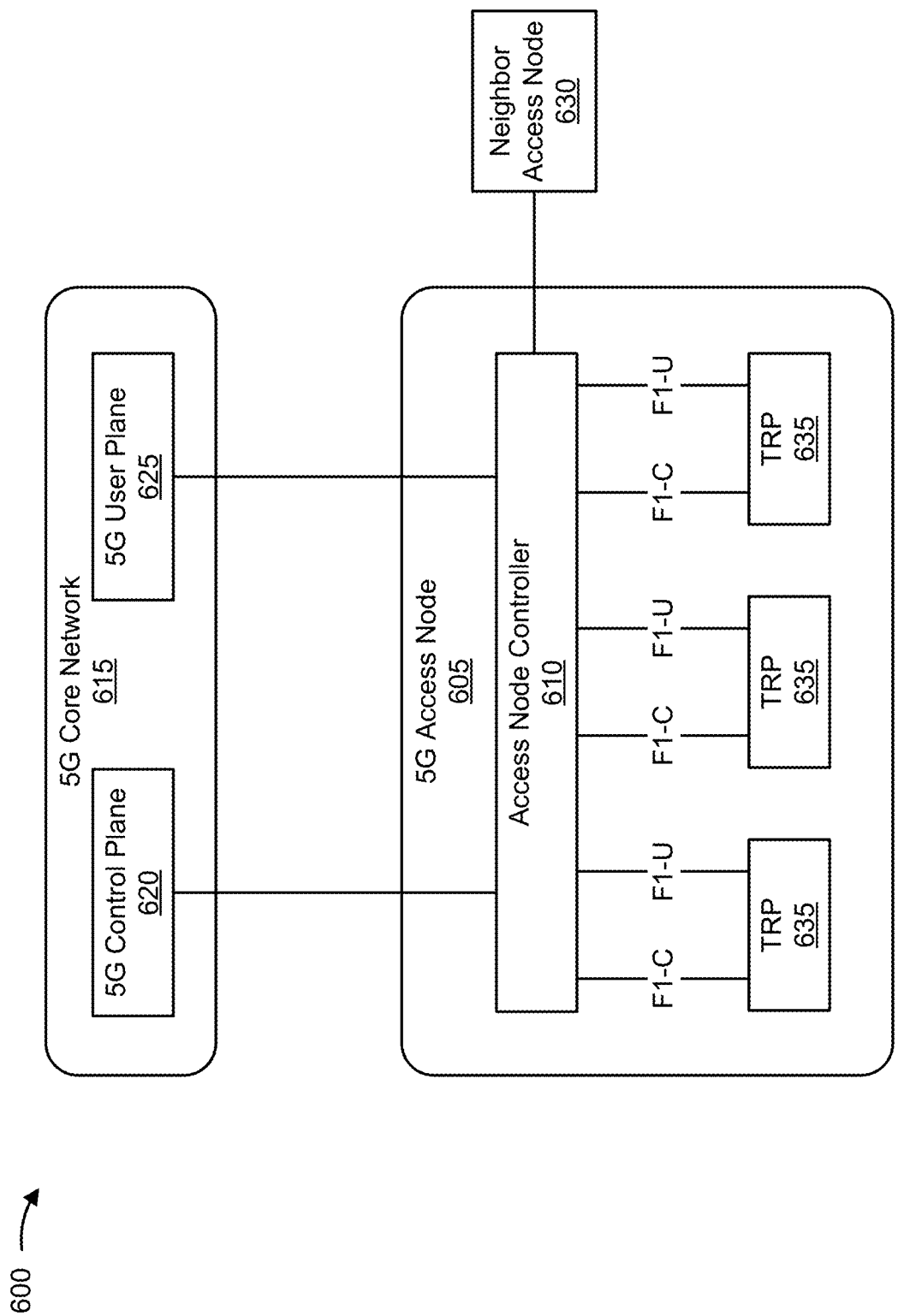
FIG. 6 is a diagram illustrating an example of a logical architecture of a distributed radio access network (RAN), in accordance with the present disclosure.

FIG. 6 is a diagram illustrating an example 600 of a logical architecture of a distributed RAN, in accordance with the present disclosure.

As shown in FIG. 6, a 5G access node 605 may include an access node controller 610. The access node controller 610 may be a central unit (CU) of the distributed RAN. In some aspects, a backhaul interface to a 5G core network 615 may terminate at the access node controller 610. The 5G core network 615 may include a 5G control plane component 620 and a 5G user plane component 625 (e.g., a 5G gateway), and the backhaul interface for one or both of the 5G control plane and the 5G user plane may terminate at the access node controller 610. Additionally, or alternatively, a backhaul interface to one or more neighbor access nodes 630 (e.g., another 5G access node 605 and/or an LTE access node) may terminate at the access node controller 610.

The access node controller 610 may include and/or may communicate with one or more TRPs 635 (e.g., via an F1 Control (F1-C) interface and/or an F1 User (F1-U) interface). A TRP 635 may be a distributed unit (DU) of the distributed RAN. In some aspects, a TRP 635 may correspond to a base station 110 described above in connection with FIG. 1. For example, different TRPs 635 may be included in different base stations 110. Additionally, or alternatively, multiple TRPs 635 may be included in a single base station 110. In some aspects, a base station 110 may include a CU (e.g., access node controller 610) and/or one or more DUs (e.g., one or more TRPs 635). In some cases, a TRP 635 may be referred to as a cell, a panel, an antenna array, or an array.

A TRP 635 may be connected to a single access node controller 610 or to multiple access node controllers 610. In some aspects, a dynamic configuration of split logical functions may be present within the architecture of distributed RAN. For example, a packet data convergence protocol (PDCP) layer, a radio link control (RLC) layer, and/or a MAC layer may be configured to terminate at the access node controller 610 or at a TRP 635.

In some aspects, multiple TRPs 635 may transmit communications (e.g., the same communication or different communications) in the same TTI (e.g., a slot, a mini-slot, a subframe, or a symbol) or different TTIs using different QCL relationships (e.g., different spatial parameters, different TCI states, different precoding parameters, and/or different beamforming parameters). In some aspects, a TCI state may be used to indicate one or more QCL relationships. A TRP 635 may be configured to individually (e.g., using dynamic selection) or jointly (e.g., using joint transmission with one or more other TRPs 635) serve traffic to a UE 120.

As indicated above, FIG. 6 is provided as an example. Other examples may differ from what was described with regard to FIG. 6.

Figure 7:
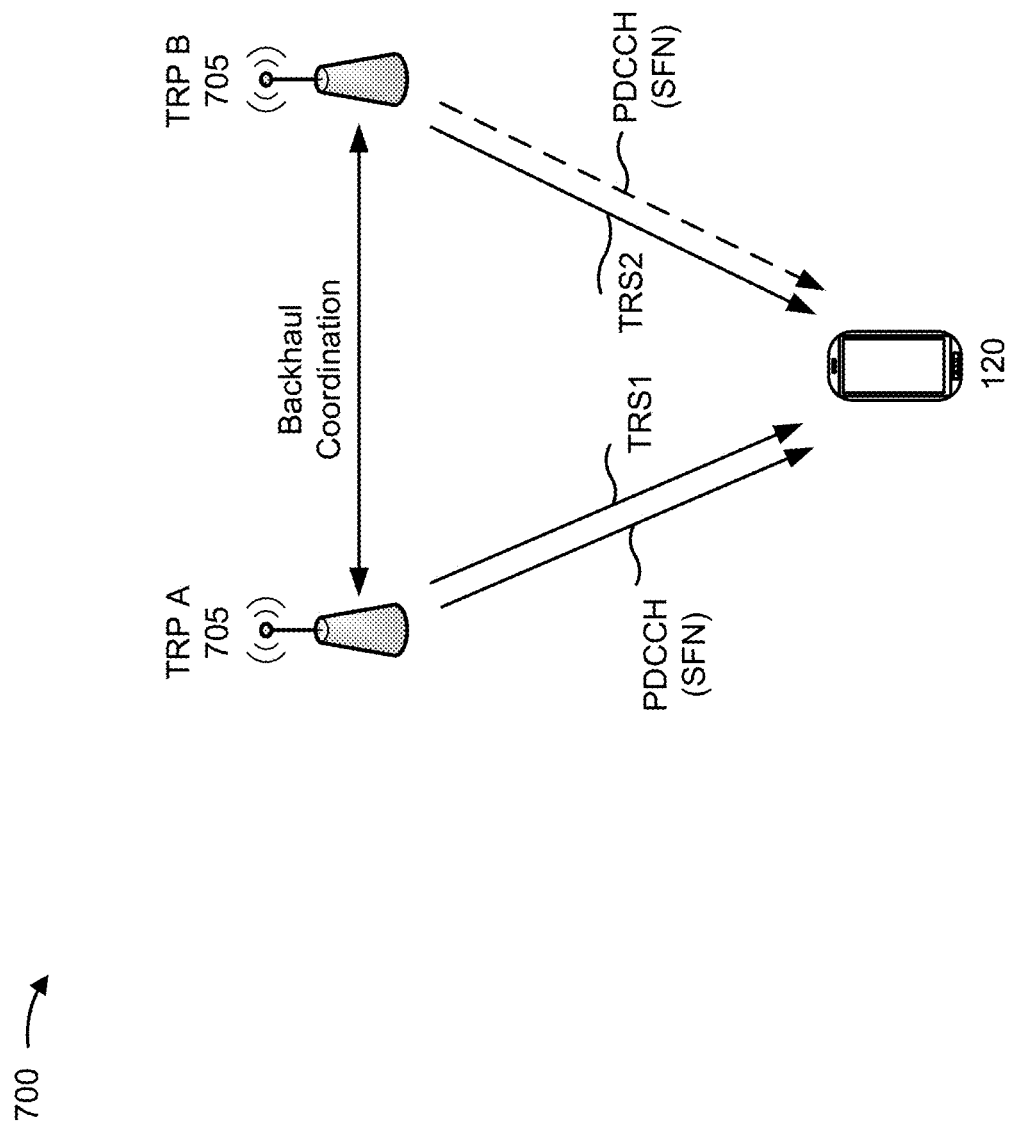
FIG. 7 is a diagram illustrating an example 700 of multi-transmit receive point (TRP) communication, in accordance with the present disclosure.

FIG. 7 is a diagram illustrating an example 700 of multi-TRP communication (sometimes referred to as multi-panel communication), in accordance with the present disclosure. As shown in FIG. 7, multiple TRPs 705 may communicate with the same UE 120. A TRP 705 may correspond to a TRP 635 described above in connection with FIG. 6.

The multiple TRPs 705 (shown as TRP A and TRP B) may communicate with the same UE 120 in a coordinated manner (e.g., using coordinated multipoint transmissions) to improve reliability and/or increase throughput. The TRPs 705 may coordinate such communications via an interface between the TRPs 705 (e.g., a backhaul interface and/or an access node controller 610). The interface may have a smaller delay and/or higher capacity when the TRPs 705 are co-located at the same base station 110 (e.g., when the TRPs 705 are different antenna arrays or panels of the same base station 110), and may have a larger delay and/or lower capacity (as compared to co-location) when the TRPs 705 are located at different base stations 110. The different TRPs 705 may communicate with the UE 120 using different QCL relationships (e.g., different TCI states), different DMRS ports, and/or different layers (e.g., of a multi-layer communication).

In some aspects, in a multi-TRP transmission mode, a PDCCH communication may be transmitted using SFN PDCCH transmission. "SFN transmission" refers to multiple transmitters transmitting a signal over the same frequency channel. In the case of multi-TRP SFN PDCCH transmission, multiple TRPs 705 (e.g., TRP A and TRP B) may simultaneously transmit the same PDCCH communication to the UE 120 using the same time and frequency resources. Multi-TRP SFN PDCCH transmission may improve reliability of PDCCH communications for the UE 120. For example, because the multiple TRPs 705 may transmit the same PDCCH communication on the same time and frequency resources on different transmit beams, the UE 120 may be more likely to receive and decode the PDCCH communication, particularly when a blockage may obstruct one of the beams or in high mobility situations, such as in a high speed train (HST) scenario. In some examples, the transmission mode for a PDSCH communication may not be the same as the PDCCH communication that schedules the PDSCH communication. For example, an SFN PDCCH transmission (e.g., an PDCCH communication transmitted in an SFN transmission mode) may schedule a PDSCH communication that is transmitted in the SFN transmission mode or may schedule a PDSCH transmission that is transmitted in a transmission mode other than the SFN transmission mode.

In some aspects, a CORESET may be configured (e.g., via an RRC configuration) with a parameter (e.g., a higher layer parameter) that indicates that DCI/PDCCH communications received on the CORESET are SFN PDCCH transmissions. Such a CORESET that is configured for receiving SFN PDCCH transmissions may be referred to as an "SFN CORESET." In some cases, an SFN CORESET may be configured with multiple TCI states that can be activated for receiving SFN PDCCH transmissions. In this case, the UE 120 may receive (e.g., from at least one of the TRPs 705) an activation command that indicates two TCI states to be activated to monitor for/receive the SFN PDCCH transmission. For example, the UE may receive a MAC-CE activation command that indicates a first TCI state to be activated for receiving the PDCCH communication from a first TRP 705 (e.g., TRP A) and a second TCI state to be activated for receiving the PDCCH communication from a second TRP 705 (e.g., TRP B). In some aspects, timing reference signals (TRSs) may be used as a source reference signal for the TCI states for SFN PDCCH transmission. For example, the first TCI state may indicate a TCI state associated with a first TRS (TRS1) transmitted to the UE 120 from TRP A 705, and the second TCI state a TCI state associated with a second TRS (TRS2) transmitted to the UE 120 from TRP B 705. In this case, both TCI states may be associated with QCL properties, such as average delay, delay spread, Doppler shift, and Doppler spread (e.g., QCL-Type A).

As indicated above, FIG. 7 is provided as an example. Other examples may differ from what is described with respect to FIG. 7.

In some cases, a UE with a CORESET configured as an SFN CORESET may not receive a MAC-CE activation command that indicates multiple TCIs to be activated for SFN PDCCH reception. For example, the UE may not receive any MAC-CE activation command, or the UE may receive a MAC-CE activation command that indicates only a single TCI state to be activated. In these cases, there is no specified behavior for how the UE determined which TCI state(s) to use for PDCCH reception. This may lead to the UE monitoring a search space associated with the CORESET using an incorrect TCI state, or the UE not monitoring the search space associated with the CORESET during a monitoring occasion. As a result, reliability of PDCCH reception and decoding may be reduced for a UE, leading to increased network latency, decreased network speed, and increased UE power consumption (e.g., due to increased monitoring and/or decoding of repeated PDCCH transmissions).

In some case, a UE may receive an SFN PDCCH transmission that includes a PDCCH order requesting a random access procedure. In this case, the UE may receive the PDCCH order from two TRPs, and the CORESET may be configured and activated with two TCI states. However, the UE may not know what beam (e.g., what TCI state) to use to monitor for receiving the RAR PDCCH communication (e.g., the PDCCH with DCI format 1_0 with RA-RNTI that schedules the RAR PDSCH communication) and/or for receiving the RAR PDSCH communication. This may result in increased random access procedure failures due to failure of the UE to receive and/or decode the RAR PDCCH communication and/or the RAR PDSCH communication, which may lead to increased network latency, reduced network speed, and increased UE power consumption (e.g., due to repeated random access procedure attempts by the UE).

Some techniques and apparatuses described herein enable a UE to receive, from a base station, a CORESET configuration that includes an indication that the CORESET is an SFN CORESET. The UE may determine one or more TCI states for monitoring the SFN CORESET based at least in part on a determination that the UE has not received an activation command that indicates multiple TCI states to be activated. In some aspects, the UE may determine the one or more TCI states based at least in part on a determination that UE has not received an activation command. In some aspects, the UE may determine the one or more TCI states based at least in part on a determination that the UE has received an activation command that indicates a single TCI state to be activated for the SFN CORESET. The UE may receive a PDCCH communication using the one or more TCI states determined for monitoring the SFN CORESET. As a result, the UE may determine one or more TCI states to use to monitor a search space associated with an SFN CORESET even when an activation command that activates multiple TCI states for the SFN CORESET is not received by the UE. This may reduce missed PDCCH reception and/or decoding by the UE, resulting in decreased network latency, increased network speed, and reduced UE power consumption.

Some techniques and apparatuses described herein enable a UE to receive, using a first TCI state and a second TCI state, an SFN PDCCH communication requesting a random access procedure. The UE may transmit, based at least in part on receiving the SFN PDCCH communication, a PRACH communication included a random access preamble. The UE may receive at least one of an RAR PDCCH communication or an RAR PDSCH communication using one or more TCI states determined based at least in part on the first TCI state or the second TCI state. As a result, reliability of reception and/or decoding, by the UE, of the RAR PDCCH communication and/or the RAR PDSCH communication in the random access procedure may be increased, which may decrease random access failures for the UE. This may lead to increased network latency, reduced network speed, and increased UE power consumption (e.g., due to repeated random access procedure attempts by the UE).

Figure 8:
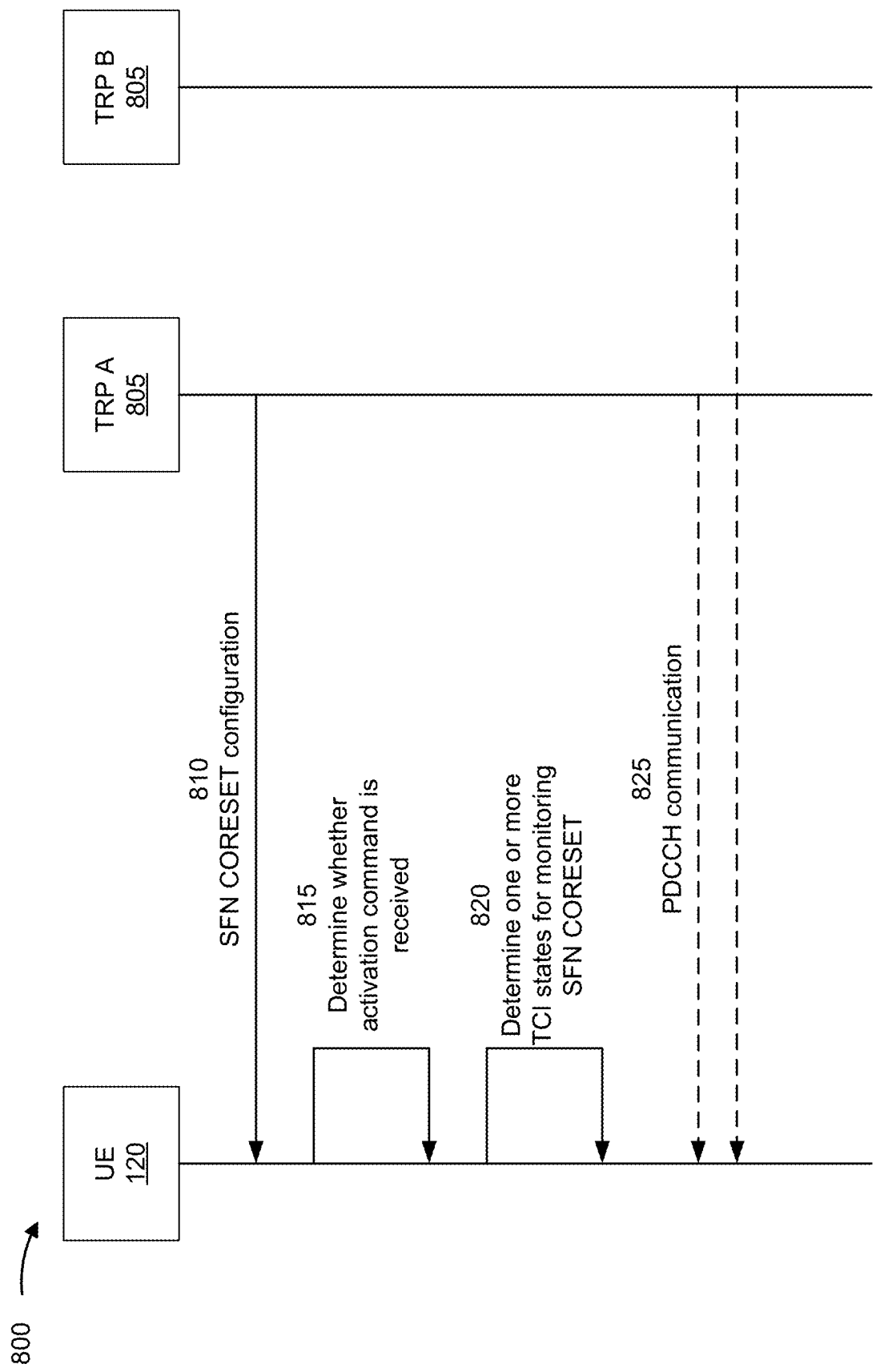
FIGS. 8-9 are diagrams illustrating examples associated with transmission configuration indicator (TCI) state determination for a single frequency network (SFN) control resource set (CORESET), in accordance with the present disclosure.

FIG. 8 is a diagram illustrating an example 800 associated with TCI state determination for an SFN CORESET, in accordance with the present disclosure. As shown in FIG. 8, example 800 includes communication between a UE 120 and multiple TRPs 805. The multiple TRPs 805 may include a first TRP ("TRP A") 805 and a second TRP ("TRP B") 805. In some aspects, the TRPs 805 and the UE 120 may be included in a wireless network, such as wireless network 100. The UE 120 may communicate with the TRPs 805 via wireless access links, which may include uplinks and downlinks.

The TRPs 805 may correspond to TRPs described elsewhere herein, such as TRPs 635 described above in connection with FIG. 6 and/or TRPs 705 described above in connection with FIG. 7. The TRPs 805 may communicate with each other and may coordinate communications with the UE 120 via an interface between the TRPs 805 (e.g., a backhaul interface and/or an access node controller). In some aspects, the TRPs 805 may be co-located at the same base station 110. For example, the TRPs 805 may be different antenna arrays or panels of the same base station 110. In some aspects, the TRPs 805 may be located at different base stations 110.

As shown in FIG. 8, and by reference number 810, the UE 120 may receive, from a base station (e.g., a base station associated with a TRP 805), an SFN CORESET configuration. For example, a TRP 805 (e.g., TRP A) may transmit, to the UE 120, an RRC message including the SFN CORESET configuration. The SFN CORESET configuration may be a CORESET configuration that includes an indication that the CORESET is an SFN CORESET. For example, the configuration may include an indication that PDCCH communications received on the CORESET are SFN PDCCH communications (e.g., PDCCH communications transmitted from multiple TRPs 805 on the same time and frequency resources). In some aspects, the configuration may indicate multiple configured TCI states for the SFN CORESET.

As further shown in FIG. 8, and by reference number 815, the UE 120 may determine whether an activation command associated with the SFN CORESET is received. An activation command may be a communication (e.g., a MAC-CE communication) that indicates one or more TCI states to be activated for a CORESET. In some aspects, the UE 120 may determine whether any activation command (e.g., a MAC-CE activation command) is received for the SFN CORESET. In some aspects, the UE 120 may determine whether an activation command (e.g., a MAC-CE activation command) is received that indicates multiple (e.g., two) TCI states to be activated for the SFN CORESET.

In some aspects, the UE 120 may determine whether an activation command associated with the SFN CORESET is received (e.g., in a MAC-CE) prior to a monitoring occasion in which a search space associated with the SFN CORESET is to be monitored. In some aspects, the UE 120 may determine whether an activation command associated with the SFN CORESET is received within a time duration after receiving the SFN CORESET configuration.

As further shown in FIG. 8, and by reference number 820, the UE 120 may determine one or more TCI states for monitoring the SFN CORESET. In some aspects, the UE 120 may determine the one or more TCI states for monitoring the SFN CORESET based at least in part on determining that no activation command associated with the SFN CORESET has been received by the UE 120 (e.g., the UE 120 has not received an activation command that indicates any TCI states to be activated for the SFN CORESET). For example, the UE 120 may determine the one or more TCI states based at least in part on a determination that no activation command associated with the SFN CORESET has been received by the UE 120 prior to a monitoring occasion associated with the SFN CORESET (and/or within a threshold time duration after receiving the SFN CORESET configuration).

In some aspects, based at least in part on the determination that the UE 120 has not received an activation command associated with the SFN CORESET, the UE 120 may determine a single TCI state to be used for monitoring the SFN CORESET for PDCCH communications. In this case, the UE 120 may fall back to a single TCI state/QCL assumption for PDCCH monitoring and reception. In some aspects, the UE 120 may assume a QCL relationship between the PDCCH and an SSB selected by the UE 120 during an initial access procedure. In this case, the UE 120 may select, as the single TCI state for monitoring the SFN CORESET, the TCI state associated with the SSB selected during the initial access procedure.

In some aspects, in case in which the SFN CORESET configuration indicates multiple configured TCI states, but the UE 120 has not received an activation command that activates any of the configured TCI states, the UE 120 may assume a QCL relationship between the PDCCH and one of the configured TCI states. In this case, the UE 120 may select, as the single TCI state for monitoring the SFN CORESET, one of the configured TCI states indicated in the configuration of the SFN CORESET. For example, the UE 120 may select, as the single TCI state for monitoring the SFN CORESET, a TCI state with a highest TCI state identifier (ID) among the configured TCI states for the SFN CORESET. Alternatively, the UE 120 may select, as the single TCI state for monitoring the SFN CORESET, a TCI state with a lowest TCI state ID among the configured TCI states for the SFN CORESET.

In some aspects, based at least in part on the determination that the UE 120 has not received an activation command associated with the SFN CORESET, the UE 120 may determine multiple TCI states (e.g., two TCI states) for monitoring the SFN CORESET for PDCCH communications. In this case, the UE 120 may determine a first TCI state and a second TCI state to use for monitoring and reception of PDCCH communications in a monitoring occasion. In some aspects, the first TCI state may be the TCI state associated with an SSB selected by the UE 120 during the initial access procedure, and the second TCI state may be one of the configured TCI states indicated in the configuration of the SFN CORESET. For example, the second TCI state may be a TCI state with a highest TCI state ID among the configured TCI states for the SFN CORESET, or the second TCI state may be a TCI state with a lowest TCI state ID among the configured TCI states for the SFN CORESET.

In some aspects, the SSB selected by the UE 120 during the initial access procedure may be configured with two TCI states/QCL assumptions. In this case, the UE 120 may select, as the two TCI states for monitoring the SFN CORESET for PDCCH communications, the two TCI states associated with the SSB selected during the initial access procedure. For example, the two states for monitoring the SFN CORESET may include a first TCI state associated with the SSB selected by the UE 120 during the initial access procedure and a second TCI state associated with the SSB selected by the UE 120 during the initial access procedure.

As further shown in FIG. 8, and by reference number 825, the UE 120 may receive, a PDCCH communication using the one or more TCI states determined for monitoring the SFN CORESET. In a monitoring occasion for the SFN CORESET, the UE 120 may monitor a search space associated with an SFN CORESET for PDCCH candidates on one or more beams associated with the one or more TCI states. The UE 120 may receive a PDCCH communication (e.g., by successfully decoding a PDCCH candidate) that is transmitted from one TRP 805 (e.g., TRP A or TRP B) or transmitted from multiple TRPs 805 (e.g., TRP A and TRP) based at least in part on the number of TCI states determined for monitoring the SFN CORESET.

In some aspects, in a case in which the UE 120 determines a single TCI state for monitoring the SFN CORESET, the UE 120 may monitor the search space associated with the SFN CORESET using a beam associated with the single TCI state. In this case, the UE 120 may fall back from an SFN reception mode, and the UE 120 monitor the search space for a PDCCH communications transmitted from one TRP 805 (e.g., TRP A or TRP B). The UE 120 may receive, on the beam associated with the single TCI state, a PDCCH communication transmitted by one of the TRPs 805 (e.g., TRP A or TRP B).

In some aspects, in a case in which the UE 120 determines multiple TCI states (e.g., a first TCI state and a second TCI state) for monitoring the SFN CORESET, the UE 120 may monitor the search space associated with the SFN CORESET using a first beam associated a first TCI state and a second beam associated with a second TCI state. In this case, the UE 120 may monitor the search space for SFN PDCCH communications transmitted by both TRP A 805 and TRP B. For example, TRP A 805 and TRP B may both transmit, during the monitoring occasion, a PDCCH communication on the same time and frequency resources. The UE 120 may receive, using the first beam associated with the first TCI state, the transmission of an SFN PDCCH communication from TRP A 805, and/or the UE 120 may receive, using the second beam associated with the second TCI state, the transmission of the SFN PDCCH communication from TRP B 805.

As described above in connection with FIG. 8, the UE 120 may receive a CORESET configuration that includes an indication that the CORESET is an SFN CORESET. The UE 120 may determine one or more TCI states for monitoring the SFN CORESET based at least in part on a determination that UE 120 has not received an activation command (e.g., the UE 120 has not received an activation command that includes any indications of TCI states to be activated). The UE 120 may receive a PDCCH communication using the one or more TCI states determined for monitoring the SFN CORESET. As a result, the UE 120 may determine one or more TCI states to use to monitor a search space associated with an SFN CORESET even when an activation command is not received by the UE. This may reduce missed PDCCH reception and/or decoding by the UE, resulting in decreased network latency, increased network speed, and reduced UE power consumption.

Figure 9:
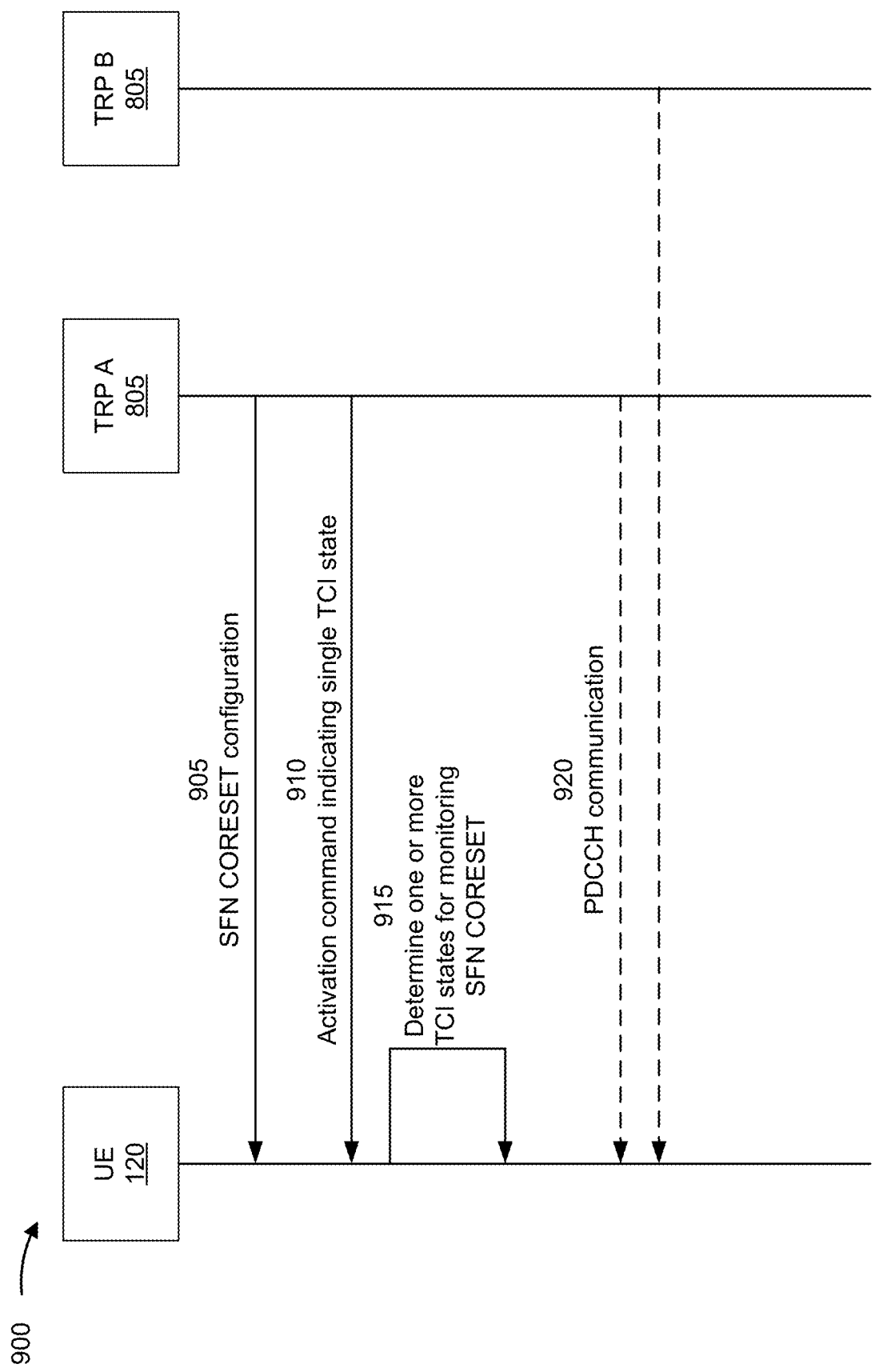

FIG. 9 is a diagram illustrating an example 900 associated with TCI state determination for an SFN CORESET, in accordance with the present disclosure. As shown in FIG. 9, example 900 includes communication between a UE 120 and multiple TRPs 805. The multiple TRPs 805 may include a first TRP ("TRP A") 805 and a second TRP ("TRP B") 805. In some aspects, the TRPs 805 and the UE 120 may be included in a wireless network, such as wireless network 100. The UE 120 may communicate with the TRPs 805 via wireless access links, which may include uplinks and downlinks.

The TRPs 805 may correspond to TRPs described elsewhere herein, such as TRPs 635 described above in connection with FIG. 6 and/or TRPs 705 described above in connection with FIG. 7. The TRPs 805 may communicate with each other and may coordinate communications with the UE 120 via an interface between the TRPs 805 (e.g., a backhaul interface and/or an access node controller). In some aspects, the TRPs 805 may be co-located at the same base station 110. For example, the TRPs 805 may be different antenna arrays or panels of the same base station 110. In some aspects, the TRPs 805 may be located at different base stations 110.

As shown in FIG. 9, and by reference number 905, the UE 120 may receive, from a base station (e.g., a base station associated with a TRP 805), an SFN CORESET configuration. For example, a TRP 805 (e.g., TRP A) may transmit, to the UE 120, an RRC message including the SFN CORESET configuration. The SFN CORESET configuration may be a CORESET configuration that includes an indication that the CORESET is an SFN CORESET. For example, the configuration may include an indication that PDCCH communications received on the CORESET are SFN PDCCH communications (e.g., PDCCH communications transmitted from multiple TRPs 805 on the same time and frequency resources). In some aspects, the configuration may indicate multiple configured TCI states for the SFN CORESET.

As further shown in FIG. 9, and by reference number 910, the UE 120 may receive, from at least one TRP 805 (shown as TRP A in FIG. 9), an activation command that indicates a single TCI state to be activated for the SFN CORESET. For example, a base station associated with a TRP 805 (e.g., TRP A) may transmit, to the UE 120, a MAC-CE activation command that includes an indication of a single TCI state to be activated for the SFN CORESET. In some aspects, the activation command (e.g., MAC-CE activation command) may indicate only a single TCI stated to be activated, even though the SFN CORESET is configured with multiple TCI states to receive SFN PDCCH transmissions from multiple TRPs 805.

In some aspects, the UE 120 may determine, based at least in part on receiving the activation command that indicates a single TCI state to be activated for the SFN CORESET, that the UE 120 has not received an activation command that indicates multiple TCI states to be activated for the SFN CORESET.

As further shown in FIG. 9, and by reference number 915, the UE 120 may determine one or more TCI states for monitoring the SFN CORESET. In some aspects, the UE 120 may determine the one or more TCI states for monitoring the SFN CORESET based at least in part on receiving the activation command that indicates the single TCI state to be activated for the SFN CORESET. For example, the UE 120 may determine the one or more TCI states for monitoring the SFN CORESET based at least in part on a determination that the UE 120 has received the activation command that indicates the single TCI state to be activated for the SFN CORESET. In some aspects, the UE 120 may determine the one or more TCI states for monitoring the SFN CORESET based at least in part on a determination that the UE 120 has not received an activation command that indicates multiple TCI states to be activated for the SFN CORESET.

In some aspects, the SFN CORESET configuration may include the indication that the CORESET is an SFN CORESET (e.g., an indication that the PDCCH received on the CORESET is SFN PDCCH), but the configuration may indicate a single configured TCI state for the SFN CORESET. In this case, based at least in part on a determination that the single TCI state indicated in the received activation command is different from the single configured TCI state, the UE 120 may determine that both the single configured TCI state and the single TCI state indicated in the activation command are to be used for monitoring the SFN CORESET. For example, in this case, the activation command may be used to indicate an additional TCI state to supplement the single configured TCI state, such that the UE 120 may use two TCI states for monitoring the SFN CORESET.

In some aspects, in a case in which the SFN CORESET configuration indicates multiple TCI states, the UE 120 may determine multiple TCI states for monitoring the SFN CORESET by overriding one of the configured TCI states for the SFN CORESET with the single TCI state indicated in the activation command, and selecting at least another one of the configured TCI states for the SFN CORESET to be used for monitoring the SFN CORESET. For example, the UE 120 may determine two TCI states (e.g., a first TCI state and a second TCI state) for monitoring the SFN CORESET. In this case, the first TCI state may be the single TCI state indicated in the activation command, and the second TCI state may be one of the configured TCI states indicated in the SFN CORESET configuration. For example, the second TCI state may be a TCI state with a highest TCI state ID among the configured TCI states for the SFN CORESET, or the second TCI state may be a TCI state with a lowest TCI state ID among the configured TCI states for the SFN CORESET.

In some aspects, based at least in part on receiving the activation command that indicates the single TCI state, UE 120 may fall back to a single TCI state/QCL assumption for PDCCH monitoring and reception. In this case, the UE 120 may determine that single TCI state for monitoring the SFN CORESET is the single TCI state indicated in the activation command.

In some aspects, based at least in part on receiving the activation command that indicates the single TCI state to be activated for the SFN CORESET, the UE 120 may treat this activation command as an error case and ignore this activation command. For example, for a CORESET configured as an SFN CORESET, the UE 120 may expect an activation command that indicates multiple TCI states to be activated, and the UE 120 may ignore any activation command that includes only a single TCI state to be activated. In this case, instead of determining the one or more TCI states based at least in part on receiving the activation command that indicates the single TCI state to be activated for the SFN CORESET (as shown in FIG. 9), the UE 120 may ignore this activation signal and wait to receive an activation signal that indicates multiple TCI states to be activated for the SFN CORESET or until the UE 120 determines that the UE 120 has not received an activation signal to determine the TCI states for monitoring the SFN CORESET.

As further shown in FIG. 9, and by reference number 920, the UE 120 may receive a PDCCH communication using the one or more TCI states determined for monitoring the SFN CORESET. In a monitoring occasion for the SFN CORESET, the UE 120 may monitor a search space associated with an SFN CORESET for PDCCH candidates on one or more beams associated with the one or more TCI states. The UE 120 may receive a PDCCH communication (e.g., by successfully decoding a PDCCH candidate) that is transmitted from one TRP 805 (e.g., TRP A or TRP B) or transmitted from multiple TRPs 805 (e.g., TRP A and TRP) based at least in part on the number of TCI states determined for monitoring the SFN CORESET.

In some aspects, in a case in which the UE 120 determines a single TCI state for monitoring the SFN CORESET, the UE 120 may monitor the search space associated with the SFN CORESET using a beam associated with the single TCI state. In this case, the UE 120 may fall back from an SFN reception mode, and the UE 120 monitor the search space for a PDCCH communication transmitted from one TRP 805 (e.g., TRP A or TRP B). The UE 120 may receive, on the beam associated with the single TCI state, a PDCCH communication transmitted by one of the TRPs 805 (e.g., TRP A or TRP B).

In some aspects, in a case in which the UE 120 determines multiple TCI states (e.g., a first TCI state and a second TCI state) for monitoring the SFN CORESET, the UE 120 may monitor the search space associated with the SFN CORESET using a first beam associated a first TCI state and a second beam associated with a second TCI state. In this case, the UE 120 may monitor the search space for SFN PDCCH communications transmitted by both TRP A 805 and TRP B. For example, TRP A 805 and TRP B may both transmit, during the monitoring occasion, a PDCCH communication on the same time and frequency resources. The UE 120 may receive, using the first beam associated with the first TCI state, the transmission of an SFN PDCCH communication from TRP A 805, and/or the UE 120 may receive, using the second beam associated with the second TCI state, the transmission of the SFN PDCCH communication from TRP B 805.

As described above in connection with FIG. 9, the UE 120 may receive a CORESET configuration that includes an indication that the CORESET is an SFN CORESET. The UE 120 may receive an activation command that indicates a single TCI state to be activated for the SFN CORESET. The UE 120 may determine one or more TCI states for monitoring the SFN CORESET based at least in part on receiving the activation command that indicates the single TCI state to be activated for the SFN CORESET. The UE 120 may receive a PDCCH communication using the one or more TCI states determined for monitoring the SFN CORESET. As a result, the UE may determine one or more TCI states to use to monitor a search space associated with an SFN CORESET even when an activation command that only activates a single TCI state is received for the SFN CORESET. This may reduce missed PDCCH reception and/or decoding by the UE, resulting in decreased network latency, increased network speed, and reduced UE power consumption As indicated above, FIG. 9 is provided as an example. Other examples may differ from what is described with respect to FIG. 9.

Figure 10:
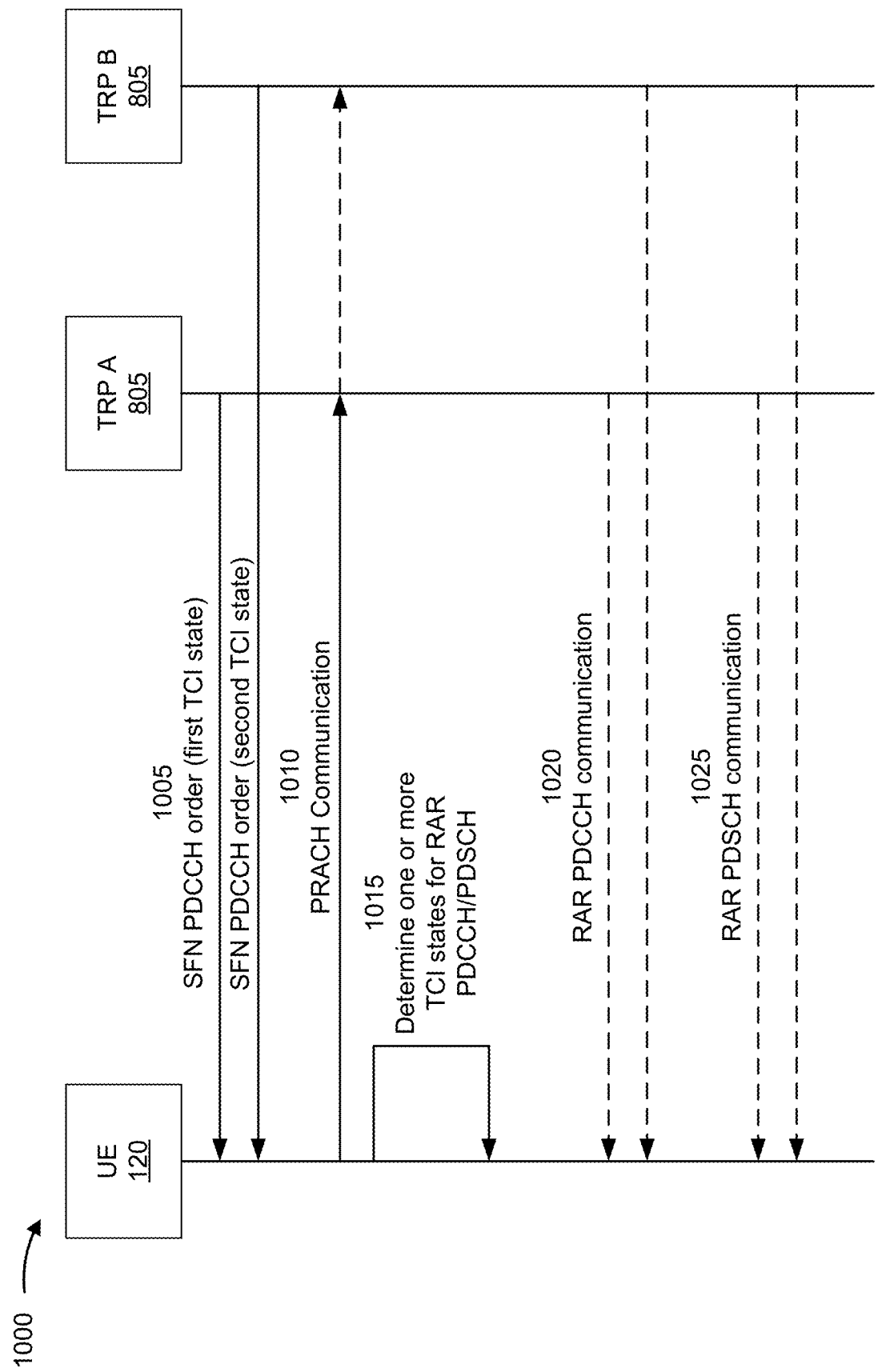
FIGS. 10-11 are diagrams illustrating examples associated with TCI state determination for an SFN PDCCH order, in accordance with the present disclosure.

FIG. 10 is a diagram illustrating an example 1000 associated with TCI state determination for an SFN PDCCH order, in accordance with the present disclosure. As shown in FIG. 10, example 1000 includes communication between a UE 120 and multiple TRPs 805. The multiple TRPs 805 may include a first TRP ("TRP A") 805 and a second TRP ("TRP B") 805. In some aspects, the TRPs 805 and the UE 120 may be included in a wireless network, such as wireless network 100. The UE 120 may communicate with the TRPs 805 via wireless access links, which may include uplinks and downlinks.

The TRPs 805 may correspond to TRPs described elsewhere herein, such as TRPs 635 described above in connection with FIG. 6 and/or TRPs 705 described above in connection with FIG. 7. The TRPs 805 may communicate with each other and may coordinate communications with the UE 120 via an interface between the TRPs 805 (e.g., a backhaul interface and/or an access node controller). In some aspects, the TRPs 805 may be co-located at the same base station 110. For example, the TRPs 805 may be different antenna arrays or panels of the same base station 110. In some aspects, the TRPs 805 may be located at different base stations 110.

As shown in FIG. 10, and by reference number 1005, the UE 120 may receive, from TRP A 805 and/or TRP B 805, an SFN PDCCH order requesting a random access procedure. TRP A 805 and TRP B 805 may each transmit the SFN PDCCH order on the same time and frequency resources. The UE 120 may receive the transmission of the SFN PDCCH order from TRP A 805 using a first TCI state (e.g., on a first beam associated with the first TCI state), and/or the UE 120 may receive the transmission of the SFN PDCCH order from TRP B 805 using a second TCI state (e.g., on a second beam associated with the second TCI state). The UE 120 may detect the SFN PDCCH order in a search space associated with an SFN CORESET by monitoring the SFN CORESET using the first TCI state and the second TCI state. In some aspects, the first TCI states may be configured for the SFN CORESET (e.g., in a CORESET configuration) and activated for an SFN CORESET (e.g., via a MAC-CE activation command). In some aspects, the UE 120 may determine the first TCI state and the second TCI state without receiving an activation command that indicates multiple TCI states to be activated, for example as described above in connection with FIG. 8 and/or FIG. 9.

In some aspects, the SFN PDCCH order may be a PDCCH communication that includes DCI format 1_0 with CRC scrambled with C-RNTI, and a FDRA field of the DCI may be set to all ones. In this case, the UE 120 may determine that the DCI corresponds to the PDCCH order requesting random access based at least in part on the FDRA field of the DCI being set to all ones. In some aspects, the DCI may indicate a random access preamble index (e.g., 6 bits), UL/SUL indication (e.g., 1 bit), and SSB index (e.g., 4 bits), and a PRACH mask index (e.g., 4 bits). In some aspects, the random access preamble index may not 0, such that the SFN PDCCH communication triggers the UE 120 to perform CFRA. In some aspects, the SFN PDCCH order may trigger the UE 120 to perform CFRA on a PCell or PSCell.

As further shown in FIG. 10, and by reference number 1010, the UE 120 may transmit a PRACH communication including a random access preamble based at least in part on receiving the SFN PDCCH order. For example, the UE 120 may transmit the PRACH communication to at least one of TRP A 805 or TRP B 805.

In some aspects, in the case of CFRA, the UE 120 may transmit the PRACH communication in a RACH occasion indicated by the SSB index in the DCI of the SFN PDCCH order. A time between the last symbol of the PDCCH order reception and the first symbol of the PRACH communication may be greater than or equal to $N_2 + \Delta_{Delay} + \Delta_{BWPSwitching} T_{switch}$. $N_2$ is a PUSCH preparation time for the UE 120 (e.g., for UE processing capability 1). $\Delta_{Delay}$ is delay that is based on the frequency of the operating band. For example, $\Delta_{Delay}$ may be 0.5 ms for FR1 or 0.25 ms for FR2. $\Delta_{BWPSwitching}/T_{switch}$ are added when there is BWP switching/uplink switching between reception of the PDCCH order and transmission of the PRACH communication, and otherwise are 0.

As further shown in FIG. 10, and by reference number 1015, the UE 120 may determine one or more TCI states for receiving an RAR PDCCH communication and/or an RAR PDSCH communication. The RAR PDCCH communication refers to a PDCCH communication (e.g., PDCCH including DCI format 1_0 with CRC scrambled with RA-RNTI) that schedules the RAR PDSCH communication. In some aspects, the UE 120 may determine the one or more TCI states based at least in part on at least one of the first TCI state associated with the SFN PDCCH order or the second TCI state associated with the PDCCH order.

In some aspects, the UE 120 may determine a single TCI state for receiving the RAR PDCCH communication and/or the RAR PDSCH communication. In this case, the single TCI state may be the first TCI state (e.g., the first TCI state associated with the SFN PDCCH order) or the second TCI state (e.g., the second TCI state associated with the SFN PDCCH order). For example, the UE 120 may assume that the RAR PDCCH and/or the RAR PDSCH is quasi co-located (e.g., has a QCL relationship) with either the first beam (e.g., first TCI state) used for the SFN PDCCH or the second beam (e.g., second TCI state) used for the SFN PDCCH. In some aspects, the UE 120 may select the first TCI state or the second TCI state based at least in part on the respective TCI state IDs for the first TCI state and the second TCI state. For example, the UE 120 may select, as the single TCI state, a TCI state having a lower TCI state ID among the first TCI state and the second TCI state. Alternatively, the UE 120 may select, as the single TCI state, a TCI state having a higher TCI state ID among the first TCI state and the second TCI state.

In some aspects, the UE 120 may determine which of the first TCI state or the second TCI state to use based at least in part on an order in which the first TCI state and the second TCI state are indicated in at least one of a configuration of the SFN CORESET or an activation command (e.g., a MAC-CE activation command) that activated the first TCI state and the second TCI state. For example, the UE 120 may select, as the single TCI state, a first indicated one of the first TCI state and the second TCI state in the CORESET configuration or the activation command. Alternatively, the UE 120 may select, as the single TCI state, a second indicated one of the first TCI state and the second TCI state in the CORESET configuration or the activation command.

In some aspects, the UE 120 may determine which of the first TCI state or the second TCI state to use based at least in part on the respective TRP 805 (e.g., TRP A or TRP B)

associated with each TCI state. For example, one of the TRPs 805 (e.g., TRP A or TRP B) may be configured, for the UE 120, as a primary or "anchor" TRP 805. In this case, the UE 120 may select, as the single TCI state, the TCI state, among the first TCI state and second TCI state, that is associated with the primary (or anchor) TRP 805.

In some aspects, the UE 120 may determine to use both the first TCI state and the second TCI state for receiving the RAR PDCCH communication and/or the RAR PDSCH communication. For example, the UE 120 may assume the RAR PDCCH and/or the RAR PDSCH have QCL relationships with both the first beam (e.g., the first TCI state) used for the SFN PDCCH order and the second beam (e.g., the second TCI state) used for the SFN PDCCH order. In this case, the RAR PDCCH communication may be transmitted as an SFN PDCCH transmission, and/or the RAR PDSCH communication may be a multi-TCI state PDSCH communication transmitted using at least one of space division multiplexing (SDM), frequency division multiplexing (FDM), time division multiplexing (TDM), or SFN transmission.

As further shown in FIG. 10, and by reference number 1020, the UE 120 may receive the RAR PDCCH communication using the one or more TCI states determined for receiving the RAR PDCCH communication and/or the RAR PDSCH communication. The RAR PDCCH communication may be a PDCCH communication including DCI format 1_0 with CRC scrambled by RA-RNTI. The DCI included in the RAR PDCCH communication may schedule the RAR PDSCH communication.

In some aspects, in a case in which the UE 120 determines a single TCI state (e.g., the first TCI state or the second TCI state) for receiving the RAR PDCCH communication and/or the RAR PDSCH communication, the UE 120 may monitor for the RAR PDCCH communication (e.g., monitor for a PDCCH communication including DCI with CRC scrambled by RA-RNTI), using the single TCI state (e.g., on a beam associated with the single TCI state. In a case in which the single TCI state is the first TCI state, the UE 120 may receive the RAR PDCCH communication (on a beam associated with the first TCI state) from TRP A 805. In a case in which the single TCI state is the second TCI state, the UE 120 may receive the RAR PDCCH communication (on a beam associated with the second TCI state) from TRP B 805.

In some aspects, in a case in which the UE 120 determines multiple TCI states (e.g., the first TCI state and the second TCI state) for receiving the RAR PDCCH communication and/or the RAR PDSCH communication, the UE 120 may monitor for the RAR PDCCH communication (e.g., monitor for a PDCCH communication including DCI with CRC scrambled by RA-RNTI), using both the first TCI state (e.g., on a beam associated with the first TCI state) and the second TCI state (e.g., on a beam associated with the second TCI state). In this case, the RAR PDCCH communication, may be transmitted as an SFN PDCCH communication. For example, TRP A 805 and TRP B 805 may both transmit, the RAR PDCCH communication on the same time and frequency resources. The UE 120 may receive (on the beam associated with the first TCI state) the transmission of the RAR PDCCH communication from TRP A 805, and/or the UE 120 may receive (using the second beam associated with the second TCI state) the transmission of the RAR PDCCH communication from TRP B 805.

As further shown in FIG. 10, and by reference number 1025, the UE 120 may receive the RAR PDSCH communication using the one or more TCI states determined for receiving the RAR PDCCH communication and/or the RAR PDSCH communication. The RAR PDSCH communication may be scheduled by the DCI included in the RAR PDCCH communication.

In some aspects, in a case in which the UE 120 determines a single TCI state (e.g., the first TCI state or the second TCI state) for receiving the RAR PDCCH communication and/or the RAR PDSCH communication, the UE 120 may receive the RAR PDSCH communication using the single TCI state (e.g., on a beam associated with the single TCI state). In a case in which the single TCI state is the first TCI state, the UE 120 may receive the RAR PDSCH communication (on a beam associated with the first TCI state) from TRP A 805. In a case in which the single TCI state is the second TCI state, the UE 120 may receive the RAR PDSCH communication (on a beam associated with the second TCI state) from TRP B 805.

In some aspects, in a case in which the UE 120 determines multiple TCI states (e.g., the first TCI state and the second TCI state) for receiving the RAR PDCCH communication and/or the RAR PDSCH communication, the UE 120 may receive the RAR PDSCH communication using the first TCI state (e.g., a beam associated with the first TCI state) and the second TCI state (e.g., a beam associated with the second TCI state). In this case, the RAR PDSCH communication may be a multi-TCI state PDSCH communication, transmitted by TRP A 805 and TRP B 805 using at least one of SDM, FDM, TDM, or SFN transmission.

As described above in connection with FIG. 10, the UE 120 may receive, using a first TCI state and a second TCI state, an SFN PDCCH communication requesting a random access procedure. The UE 120 may transmit, based at least in part on receiving the SFN PDCCH communication, a PRACH communication included a random access preamble. The UE 120 may receive at least one of an RAR PDCCH communication or an RAR PDSCH communication using one or more TCI states determined based at least in part on the first TCI state or the second TCI state. As a result, reliability of reception and/or decoding, by the UE, of the RAR PDCCH communication and/or the RAR PDSCH communication in the random access procedure may be increased, which may decrease random access failures for the UE. This may lead to increased network latency, reduced network speed, and increased UE power consumption (e.g., due to repeated random access procedure attempts by the UE).

As indicated above, FIG. 10 is provided as an example. Other examples may differ from what is described with respect to FIG. 10.

Figure 11:
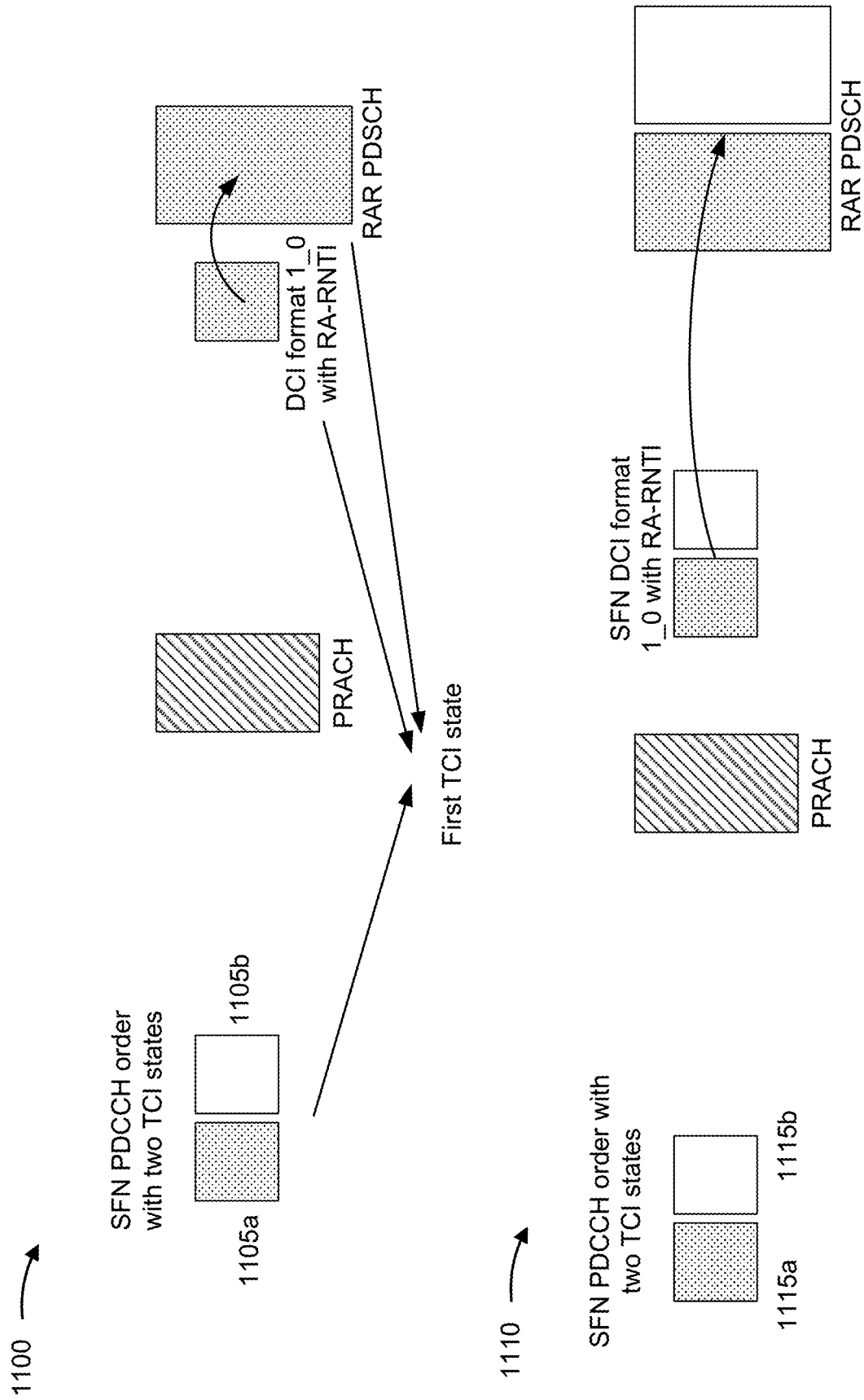

FIG. 11 is a diagram illustrating examples 1100 and 1110 associated with TCI state determination for an SFN PDCCH order, in accordance with the present disclosure. As shown in FIG. 11, example 1100 illustrates an example in which a UE 120 determines a single TCI state/QCL assumption for receiving an RAR PDCCH communication and an RAR PDSCH communication based at least in part on multiple TCI states associated with an SFN PDCCH order. As shown in example 1100, the UE 120 may receive an SFN PDCCH order with two TCI states (e.g., a first TCI state 1105*a* and a second TCI state 1105*b*). For example, the UE 120 may receive the SFN PDCCH order in an SFN CORESET with the two TCI states configured and activated. The UE 120 may transmit a PRACH communication based at least in part on receiving the SFN PDCCH order. The UE 120 may determine to use the first TCI state 1105*a* for receiving the RAR PDCCH communication and the RAR PDSCH communication. The UE 120 may monitor for and receive a PDCCH communication including DCI format 1_0 with RA-RNTI (e.g., the RAR PDCCH communication) on a beam associated with the first TCI state 1105*a*. The DCI may schedule the RAR PDSCH communication. The UE 120 may receive the RAR PDSCH communication on the beam associated with the first TCI state 1105*a*.

As further shown in FIG. 11, example 1110 illustrates an example in which a UE 120 determines two TCI states for receiving an RAR PDCCH communication and an RAR PDSCH communication based at least in part on multiple TCI states associated with an SFN PDCCH order. As shown in example 1110, the UE 120 may receive an SFN PDCCH order with two TCI states (e.g., a first TCI state 1115*a* and a second TCI state 1115*b*). For example, the UE 120 may receive the SFN PDCCH order in an SFN CORESET with the two TCI states configured and activated. The UE 120 may transmit a PRACH communication based at least in part on receiving the SFN PDCCH order. The UE 120 may determine to use both the first TCI state 1115*a* and the second TCI state 1115*b* for receiving the RAR PDCCH communication and the RAR PDSCH communication. The UE 120 may monitor for an SFN PDCCH communication including DCI format 1_0 with RA-RNTI (e.g., the RAR PDCCH communication) on a first beam associated with the first TCI state 1115*a* and on a second beam associated with the second TCI state 1115*b*. The UE 120 may receive the SFN PDCCH communication on the first beam and/or the second beam. The DCI may schedule the RAR PDSCH communication. The RAR PDSCH communication may be a multi-TCI state transmission transmitted from multiple TRPs using at least one of SDM, FDM, TDM, or SFN transmission. The UE 120 may receive the RAR PDSCH communication on the first beam associated with the first TCI state 1115*a* and the second beam associated with the second TCI state 1115*b*.

As indicated above, FIG. 11 is provided as an example. Other examples may differ from what is described with respect to FIG. 11.

Figure 12:
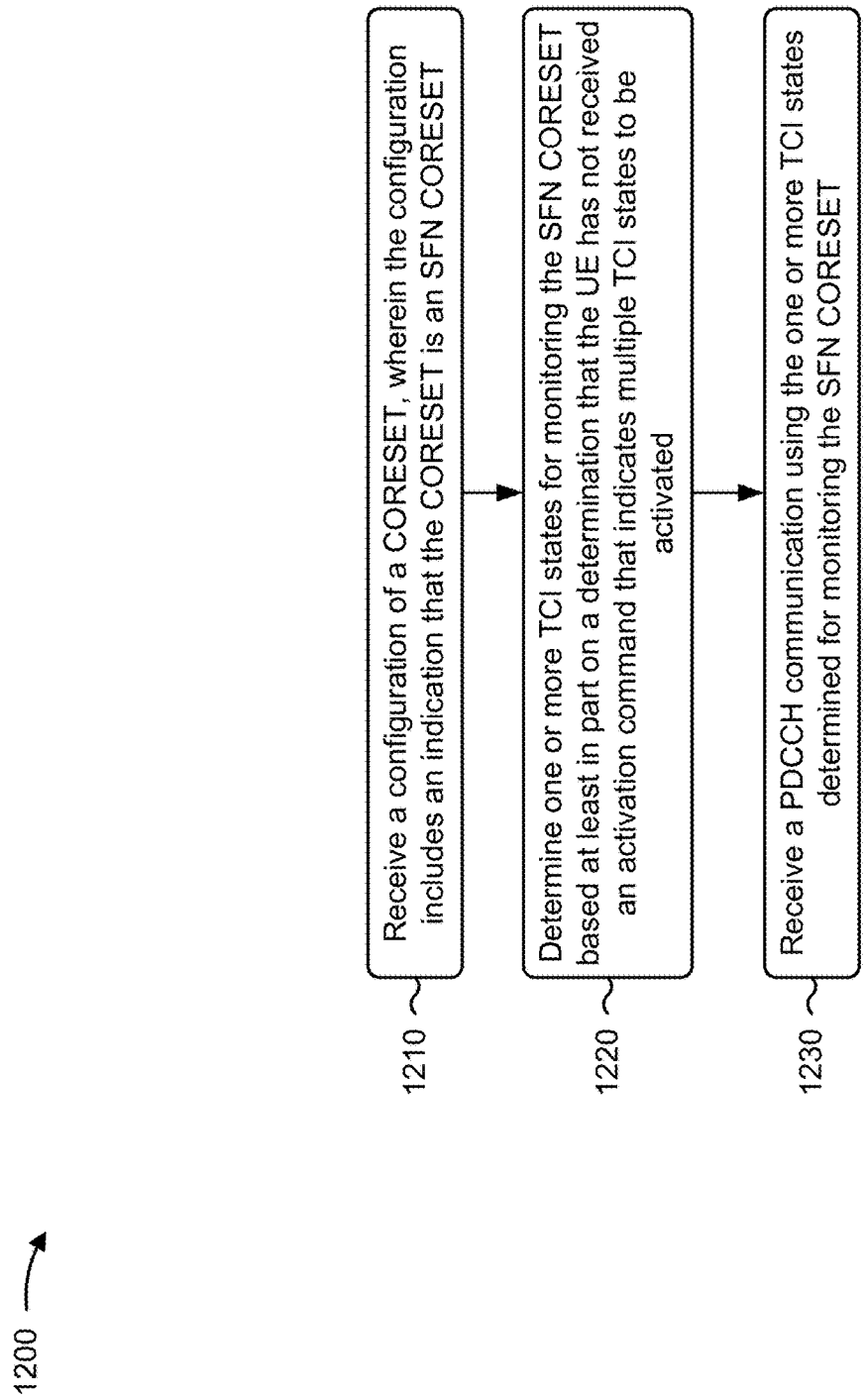
FIG. 12 is a diagram illustrating an example process associated with TCI state determination for an SFN CORESET, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with TCI state determination for an SFN CORESET As shown in FIG. 12, in some aspects, process 1200 may include receiving, from a base station, a configuration of a CORESET, wherein the configuration includes an indication that the CORESET is an SFN CORESET (block 1210). For example, the UE (e.g., using reception component 1402, depicted in FIG. 14) may receive, from a base station, a configuration of a CORESET, wherein the configuration includes an indication that the CORESET is an SFN CORESET, as described above.

As further shown in FIG. 12, in some aspects, process 1200 may include determining one or more TCI states for monitoring the SFN CORESET based at least in part on a determination that the UE has not received an activation command that indicates multiple TCI states to be activated (block 1220). For example, the UE (e.g., using determination component 1408, depicted in FIG. 14) may determine one or more TCI states for monitoring the SFN CORESET based at least in part on a determination that the UE has not received an activation command that indicates multiple TCI states to be activated, as described above.

As further shown in FIG. 12, in some aspects, process 1200 may include receiving a PDCCH communication using the one or more TCI states determined for monitoring the SFN CORESET (block 1230). For example, the UE (e.g., using reception component 1402, depicted in FIG. 14) may receive a PDCCH communication using the one or more TCI states determined for monitoring the SFN CORESET, as described above.

Process 1200 may include additional aspects, such as any single aspect or any combination of aspects described below and/or in connection with one or more other processes described elsewhere herein.

In a first aspect, determining the one or more TCI states for monitoring the SFN CORESET includes determining a single TCI state for monitoring the SFN CORESET, based at least in part on a determination that the UE has not received an activation command that indicates any TCI states to be activated.

In a second aspect, alone or in combination with the first aspect, the single TCI state is a TCI state associated with a synchronization signal block selected by the UE during an initial access procedure.

In a third aspect, alone or in combination with one or more of the first and second aspects, the configuration indicates multiple configured TCI states for the SFN CORESET, and the single TCI state is one of a TCI state with a highest TCI state ID among the configured TCI states for the SFN CORESET or a TCI state with a lowest TCI state ID among the TCI states for the SFN CORESET.

In a fourth aspect, alone or in combination with one or more of the first through third aspects, determining the one or more TCI states for monitoring the SFN CORESET includes determining two TCI states for monitoring the SFN CORESET, based at least in part on a determination that the UE has not received an activation command that indicates any TCI states to be activated.

In a fifth aspect, alone or in combination with one or more of the first through fourth aspects, the configuration indicates multiple configured TCI states for the SFN CORESET, and the two TCI states include a first TCI state that is a TCI state associated with a synchronization signal block selected by the UE during an initial access procedure, and a second TCI state that is one of a TCI state with a highest TCI state ID among the configured TCI states for the SFN CORESET or a TCI state with a lowest TCI state ID among the TCI states for the SFN CORESET.

In a sixth aspect, alone or in combination with one or more of the first through fifth aspects, the two TCI states include a first TCI state associated with a synchronization signal block selected by the UE during an initial access procedure and a second TCI state associated with the synchronization signal block selected by the UE during the initial access procedure.

In a seventh aspect, alone or in combination with one or more of the first through sixth aspects, process 1200 includes receiving an activation command that indicates a single TCI state to be activated for the SFN CORESET, and ignoring the activation command that indicates the single TCI state to be activated for the SFN CORESET.

In an eighth aspect, alone or in combination with one or more of the first through seventh aspects, process 1200 includes receiving an activation command that indicates a single TCI state to be activated, wherein determining the one or more TCI states for monitoring the SFN CORESET is based at least in part on a determination that the UE has received the activation command that indicates the single TCI state to be activated.

In a ninth aspect, alone or in combination with one or more of the first through eighth aspects, the configuration indicates a single configured TCI state for the SFN CORESET, and the one or more TCI states include a first TCI state that is the single configured TCI state indicated in the configuration, and a second TCI state that is the single TCI state indicated in the activation command.

In a tenth aspect, alone or in combination with one or more of the first through ninth aspects, the configuration indicates a plurality of configured TCI states for the SFN CORESET, and the one or more TCI states include a first TCI state that is the single TCI state indicated in the activation command, and a second TCI state that is one of a TCI state with a highest TCI state ID among the configured TCI states for the SFN CORESET or a TCI state with a lowest TCI state ID among the TCI states for the SFN CORESET.

In an eleventh aspect, alone or in combination with one or more of the first through tenth aspects, the one or more TCI states include one TCI state that is the single TCI state indicated in the activation command.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
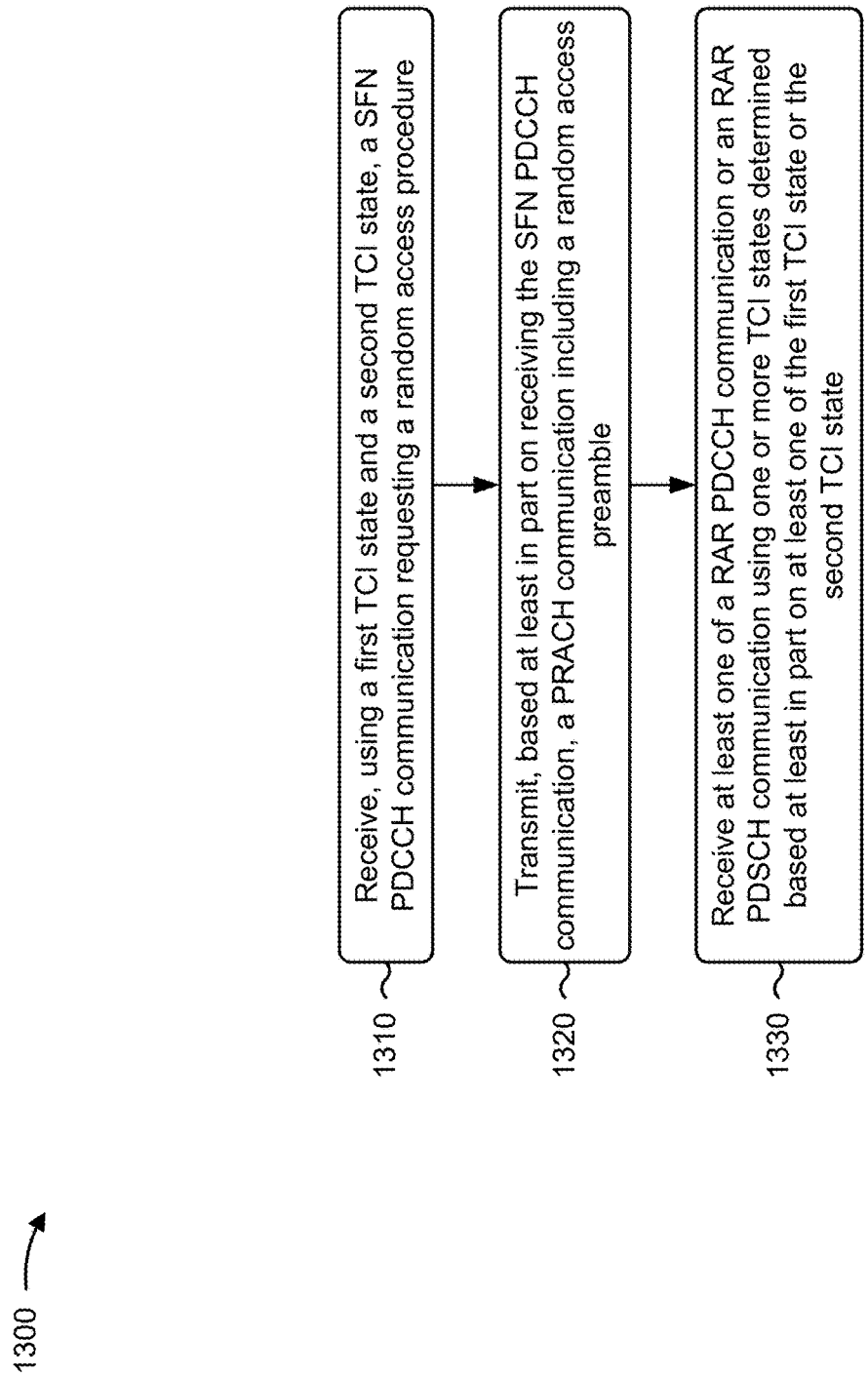
FIG. 13 is a diagram illustrating an example process associated with TCI state determination for an SFN PDCCH order, in accordance with the present disclosure.

FIG. 13 is a diagram illustrating an example process 1300 performed, for example, by a UE, in accordance with the present disclosure. Example process 1300 is an example where the UE (e.g., UE 120) performs operations associated with TCI state determination for an SFN PDCCH order.

As shown in FIG. 13, in some aspects, process 1300 may include receiving, using a first TCI state and a second TCI state, an SFN PDCCH communication requesting a random access procedure (block 1310). For example, the UE (e.g., using reception component 1402, depicted in FIG. 14) may receive, using a first TCI state and a second TCI state, an SFN PDCCH communication requesting a random access procedure, as described above.

As further shown in FIG. 13, in some aspects, process 1300 may include transmitting, based at least in part on receiving the SFN PDCCH communication, a PRACH communication including a random access preamble (block 1320). For example, the UE (e.g., using transmission component 1404, depicted in FIG. 14) may transmit, based at least in part on receiving the SFN PDCCH communication, a PRACH communication including a random access preamble, as described above.

As further shown in FIG. 13, in some aspects, process 1300 may include receiving at least one of an RAR PDCCH communication or an RAR PDSCH communication using one or more TCI states determined based at least in part on at least one of the first TCI state or the second TCI state (block 1330). For example, the UE (e.g., using reception component 1402, depicted in FIG. 14) may receive at least one of an RAR PDCCH communication or an RAR PDSCH communication using one or more TCI states determined based at least in part on at least one of the first TCI state or the second TCI state, as described above.

Process 1300 may include additional aspects, such as any single aspect or any combination of aspects described below and/or in connection with one or more other processes described elsewhere herein.

In a first aspect, the one or more TCI states include one of the first TCI state or the second TCI state.

In a second aspect, alone or in combination with the first aspect, the one of the first TCI state or the second TCI state is one of a TCI state having a lower TCI state ID among the first TCI state and the second TCI state, or a TCI state having a higher TCI state ID among the first TCI state and the second TCI state.

In a third aspect, alone or in combination with one or more of the first and second aspects, the one of the first TCI state or the second TCI state is determined based at least in part on an order in which the first TCI state and the second TCI state are indicated in at least one of a control resource set configuration or a MAC-CE activation command.

In a fourth aspect, alone or in combination with one or more of the first through third aspects, the one of the first TCI state or the second TCI state is a TCI state, among the first TCI state and second TCI state, that is associated with a primary transmit receive point.

In a fifth aspect, alone or in combination with one or more of the first through fourth aspects, the one or more TCI states include the first TCI state and the second TCI state.

In a sixth aspect, alone or in combination with one or more of the first through fifth aspects, receiving at least one of the RAR PDCCH communication or the RAR PDSCH communication includes receiving the RAR PDCCH communication using the first TCI state and the second TCI state, wherein the RAR PDCCH communication is an SFN PDCCH communication.

In a seventh aspect, alone or in combination with one or more of the first through sixth aspects, receiving at least one of the RAR PDCCH communication or the RAR PDSCH communication includes receiving the RAR PDSCH communication using the first TCI state and the second TCI state, wherein the RAR PDSCH communication is a multi-TCI state PDSCH communication transmitted using at least one of space division multiplexing, frequency division multiplexing, time division multiplexing, or SFN transmission.

In an eighth aspect, alone or in combination with one or more of the first through seventh aspects, the random access procedure is a CFRA procedure on a PCell or a PSCell.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
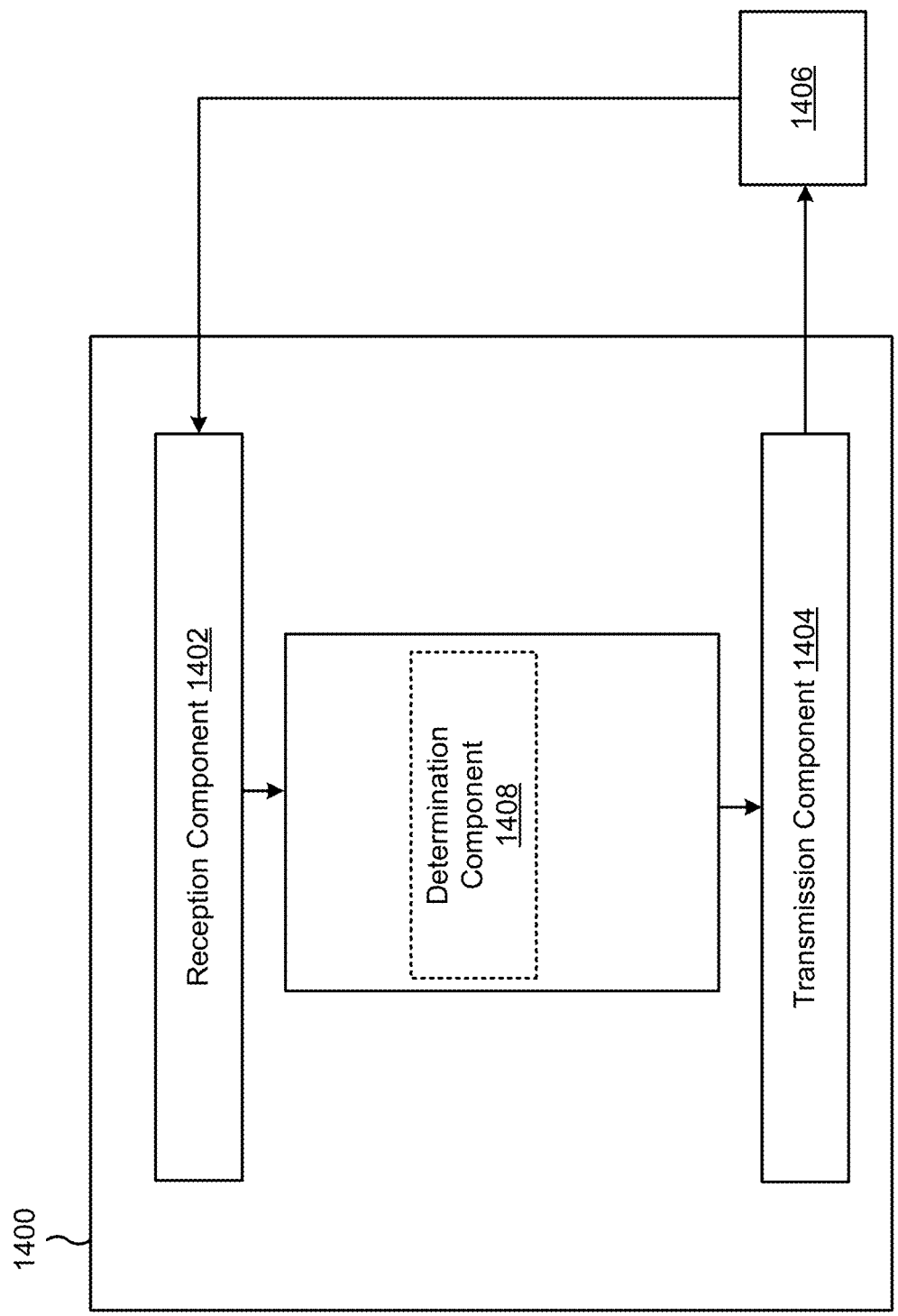
FIG. 14 is a block diagram of an example apparatus for wireless communication, in accordance with the present disclosure.

FIG. 14 is a block diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a determination component 1408, among other examples.

In some aspects, the apparatus 1400 may be configured to perform one or more operations described herein in connection with FIGS. 8-11. Additionally, or alternatively, the apparatus 1400 may be configured to perform one or more processes described herein, such as process 1200 of FIG. 12, process 1300 of FIG. 13, or a combination thereof. In some aspects, the apparatus 1400 and/or one or more components shown in FIG. 14 may include one or more components of the UE described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described above in connection with FIG. 2. In some aspects, the transmission component 1404 may be co-located with the reception component 1402 in a transceiver.

The reception component 1402 may receive, from a base station, a configuration of a CORESET, wherein the configuration includes an indication that the CORESET is an SFN CORESET. The determination component 1408 may determine one or more TCI states for monitoring the SFN CORESET based at least in part on a determination that the UE has not received an activation command that indicates multiple TCI states to be activated. The reception component 1402 may receive a PDCCH communication using the one or more TCI states determined for monitoring the SFN CORESET.

The reception component 1402 may receive an activation command that indicates a single TCI state to be activated for the SFN CORESET.

The determination component 1408 may ignore the activation command that indicates the single TCI state to be activated for the SFN CORESET.

The reception component 1402 may receive an activation command that indicates a single TCI state to be activated, wherein determining the one or more TCI states for monitoring the SFN CORESET is based at least in part on a determination that the UE has received the activation command that indicates the single TCI state to be activated.

The reception component 1402 may receive, using a first TCI state and a second TCI state, an SFN PDCCH communication requesting a random access procedure. The transmission component 1404 may transmit, based at least in part on receiving the SFN PDCCH communication, a PRACH communication including a random access preamble. The reception component 1402 may receive at least one of an RAR PDCCH communication or an RAR PDSCH communication using one or more TCI states determined based at least in part on at least one of the first TCI state or the second TCI state.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving, from a base station, a configuration of a control resource set (CORESET), wherein the configuration includes an indication that the CORESET is a single frequency network (SFN) CORESET; determining one or more transmission configuration indicator (TCI) states for monitoring the SFN CORESET based at least in part on a determination that the UE has not received an activation command that indicates multiple TCI states to be activated; and receiving a physical downlink control channel (PDCCH) communication using the one or more TCI states determined for monitoring the SFN CORESET.

Aspect 2: The method of Aspect 1, wherein determining the one or more TCI states for monitoring the SFN CORESET comprises: determining a single TCI state for monitoring the SFN CORESET, based at least in part on a determination that the UE has not received an activation command that indicates any TCI states to be activated.

Aspect 3: The method of Aspect 2, wherein the single TCI state is a TCI state associated with a synchronization signal block selected by the UE during an initial access procedure.

Aspect 4: The method of Aspect 2, wherein the configuration indicates multiple configured TCI states for the SFN CORESET, and the single TCI state is one of a TCI state with a highest TCI state identifier (ID) among the configured TCI states for the SFN CORESET or a TCI state with a lowest TCI state ID among the TCI states for the SFN CORESET.

Aspect 5: The method of Aspect 1, wherein determining the one or more TCI states for monitoring the SFN CORESET comprises: determining two TCI states for monitoring the SFN CORESET, based at least in part on a determination that the UE has not received an activation command that indicates any TCI states to be activated.

Aspect 6: The method of Aspect 5, wherein the configuration indicates multiple configured TCI states for the SFN CORESET, and the two TCI states include: a first TCI state that is a TCI state associated with a synchronization signal block selected by the UE during an initial access procedure, and a second TCI state that is one of a TCI state with a highest TCI state identifier (ID) among the configured TCI states for the SFN CORESET or a TCI state with a lowest TCI state ID among the TCI states for the SFN CORESET.

Aspect 7: The method of Aspect 5, wherein the two TCI states include a first TCI state associated with a synchronization signal block selected by the UE during an initial access procedure and a second TCI state associated with the synchronization signal block selected by the UE during the initial access procedure.

Aspect 8: The method of any of Aspects 1-7, further comprising: receiving an activation command that indicates a single TCI state to be activated for the SFN CORESET; and ignoring the activation command that indicates the single TCI state to be activated for the SFN CORESET.

Aspect 9: The method of Aspect 1, further comprising: receiving an activation command that indicates a single TCI state to be activated, wherein determining the one or more TCI states for monitoring the SFN CORESET is based at least in part on a determination that the UE has received the activation command that indicates the single TCI state to be activated.

Aspect 10: The method of Aspect 9, wherein the configuration indicates a single configured TCI state for the SFN CORESET, and the one or more TCI states include: a first TCI state that is the single configured TCI state indicated in the configuration, and a second TCI state that is the single TCI state indicated in the activation command.

Aspect 11: The method of Aspect 9, wherein the configuration indicates a plurality of configured TCI states for the SFN CORESET, and the one or more TCI states include: a first TCI state that is the single TCI state indicated in the activation command, and a second TCI state that is one of a TCI state with a highest TCI state identifier (ID) among the configured TCI states for the SFN CORESET or a TCI state with a lowest TCI state ID among the TCI states for the SFN CORESET.

Aspect 12: The method of Aspect 9, wherein the one or more TCI states include one TCI state that is the single TCI state indicated in the activation command.

Aspect 13: A method of wireless communication performed by a user equipment (UE), comprising: receiving, using a first transmission configuration indicator (TCI) state and a second TCI state, a single frequency network (SFN) physical downlink control channel (PDCCH) communication requesting a random access procedure; transmitting, based at least in part on receiving the SFN PDCCH communication, a physical random access channel (PRACH) communication including a random access preamble; and receiving at least one of a random access response (RAR) PDCCH communication or an RAR physical downlink shared channel (PDSCH) communication using one or more TCI states determined based at least in part on at least one of the first TCI state or the second TCI state.

Aspect 14: The method of Aspect 13, wherein the one or more TCI states include one of the first TCI state or the second TCI state.

Aspect 15: The method of Aspect 14, wherein the one of the first TCI state or the second TCI state is one of: a TCI state having a lower TCI state identifier (ID) among the first TCI state and the second TCI state, or a TCI state having a higher TCI state ID among the first TCI state and the second TCI state.

Aspect 16: The method of Aspect 14, wherein the one of the first TCI state or the second TCI state is determined based at least in part on an order in which the first TCI state and the second TCI state are indicated in at least one of a control resource set configuration or a MAC-CE activation command.

Aspect 17: The method of Aspect 14, wherein the one of the first TCI state or the second TCI state is a TCI state, among the first TCI state and second TCI state, that is associated with a primary transmit receive point.

Aspect 18: The method of Aspect 13, wherein the one or more TCI states include the first TCI state and the second TCI state.

Aspect 19: The method of Aspect 18, wherein receiving at least one of the RAR PDCCH communication or the RAR PDSCH communication comprises: receiving the RAR PDCCH communication using the first TCI state and the second TCI state, wherein the RAR PDCCH communication is an SFN PDCCH communication.

Aspect 20: The method of any of Aspects 18-19, wherein receiving at least one of the RAR PDCCH communication or the RAR PDSCH communication comprises: receiving the RAR PDSCH communication using the first TCI state and the second TCI state, wherein the RAR PDSCH communication is a multi-TCI state PDSCH communication transmitted using at least one of space division multiplexing, frequency division multiplexing, time division multiplexing, or SFN transmission.

Aspect 21: The method of any of Aspects 13-20, wherein the random access procedure is a contention-free random access (CFRA) procedure on a primary cell (PCell) or a primary secondary cell (PSCell).

Aspect 22: An apparatus for wireless communication at a device, comprising a processor; memory coupled with the processor; and instructions stored in the memory and executable by the processor to cause the apparatus to perform the method of one or more of Aspects 1-12.

Aspect 23: An apparatus for wireless communication at a device, comprising a processor; memory coupled with the processor; and instructions stored in the memory and executable by the processor to cause the apparatus to perform the method of one or more of Aspects 13-21.

Aspect 24: A device for wireless communication, comprising a memory and one or more processors coupled to the memory, the one or more processors configured to perform the method of one or more of Aspects 1-12.

Aspect 25: A device for wireless communication, comprising a memory and one or more processors coupled to the memory, one or more processors configured to perform the method of one or more of Aspects 13-21.

Aspect 26: An apparatus for wireless communication, comprising at least one means for performing the method of one or more of Aspects 1-12.

Aspect 27: An apparatus for wireless communication, comprising at least one means for performing the method of one or more of Aspects 13-21.

Aspect 28: A non-transitory computer-readable medium storing code for wireless communication, the code comprising instructions executable by a processor to perform the method of one or more of Aspects 1-12.

Aspect 29: A non-transitory computer-readable medium storing code for wireless communication, the code comprising instructions executable by a processor to perform the method of one or more of Aspects 13-21.

Aspect 30: A non-transitory computer-readable medium storing a set of instructions for wireless communication, the set of instructions comprising one or more instructions that, when executed by one or more processors of a device, cause the device to perform the method of one or more of Aspects 1-12.

Aspect 31: A non-transitory computer-readable medium storing a set of instructions for wireless communication, the set of instructions comprising one or more instructions that, when executed by one or more processors of a device, cause the device to perform the method of one or more of Aspects 13-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        receive, from a base station, a configuration of a control resource set (CORESET), wherein the configuration includes an indication that the CORESET is a single frequency network (SFN) CORESET;
        determine one or more transmission configuration indicator (TCI) states for monitoring the SFN CORESET based at least in part on a determination that the UE has not received an activation command that indicates multiple TCI states to be activated wherein determining the one or more TCI states for monitoring the SFN CORESET comprises determining a single TCI state for monitoring the SFN CORESET, based at least in part on a determination that the UE has not received an activation command that indicates any TCI states to be activated; and
        receive a physical downlink control channel (PDCCH) communication using the one or more TCI states determined for monitoring the SFN CORESET.

2. The UE of claim 1, wherein the single TCI state is a TCI state associated with a synchronization signal block selected by the UE during an initial access procedure.

3. The UE of claim 1, wherein the configuration indicates multiple configured TCI states for the SFN CORESET, and the single TCI state is one of a TCI state with a highest TCI state identifier (ID) among the configured TCI states for the SFN CORESET or a TCI state with a lowest TCI state ID among the TCI states for the SFN CORESET.

4. The UE of claim 1, wherein the one or more processors, to determine the one or more TCI states for monitoring the SFN CORESET, are configured to:
    determine two TCI states for monitoring the SFN CORESET, based at least in part on a determination that the UE has not received an activation command that indicates any TCI states to be activated.

5. The UE of claim 4, wherein the configuration indicates multiple configured TCI states for the SFN CORESET, and the two TCI states include:
    a first TCI state that is a TCI state associated with a synchronization signal block selected by the UE during an initial access procedure, and
    a second TCI state that is one of a TCI state with a highest TCI state identifier (ID) among the configured TCI states for the SFN CORESET or a TCI state with a lowest TCI state ID among the TCI states for the SFN CORESET.

6. The UE of claim 4, wherein the two TCI states include a first TCI state associated with a synchronization signal block selected by the UE during an initial access procedure and a second TCI state associated with the synchronization signal block selected by the UE during the initial access procedure.

7. The UE of claim 1, wherein the one or more processors are further configured to:
    receive an activation command that indicates a single TCI state to be activated for the SFN CORESET; and ignore the activation command that indicates the single TCI state to be activated for the SFN CORESET.

8. The UE of claim 1, wherein the one or more processors are further configured to:
receive an activation command that indicates a single TCI state to be activated, wherein the one or more processors, to determine the one or more TCI states for monitoring the SFN CORESET are configured to determine the one or more TCI states for monitoring the SFN CORESET based at least in part on a determination that the UE has received the activation command that indicates the single TCI state to be activated.

9. The UE of claim 8, wherein the configuration indicates a single configured TCI state for the SFN CORESET, and the one or more TCI states include:
a first TCI state that is the single configured TCI state indicated in the configuration, and
a second TCI state that is the single TCI state indicated in the activation command.

10. The UE of claim 8, wherein the configuration indicates a plurality of configured TCI states for the SFN CORESET, and the one or more TCI states include:
a first TCI state that is the single TCI state indicated in the activation command, and
a second TCI state that is one of a TCI state with a highest TCI state identifier (ID) among the configured TCI states for the SFN CORESET or a TCI state with a lowest TCI state ID among the TCI states for the SFN CORESET.

11. The UE of claim 8, wherein the one or more TCI states include one TCI state that is the single TCI state indicated in the activation command.

12. A method of wireless communication performed by a user equipment (UE), comprising:
receiving, from a base station, a configuration of a control resource set (CORESET), wherein the configuration includes an indication that the CORESET is a single frequency network (SFN) CORESET;
determining one or more transmission configuration indicator (TCI) states for monitoring the SFN CORESET based at least in part on a determination that the UE has not received an activation command that indicates multiple TCI states to be activated wherein determining the one or more TCI states for monitoring the SFN CORESET comprises determining a single TCI state for monitoring the SFN CORESET, based at least in part on a determination that the UE has not received an activation command that indicates any TCI states to be activated; and
receiving a physical downlink control channel (PDCCH) communication using the one or more TCI states determined for monitoring the SFN CORESET.

13. The method of claim 12, wherein determining the one or more TCI states for monitoring the SFN CORESET comprises:
determining two TCI states for monitoring the SFN CORESET, based at least in part on a determination that the UE has not received an activation command that indicates any TCI states to be activated.

14. The method of claim 13, wherein the configuration indicates multiple configured TCI states for the SFN CORESET, and the two TCI states include:
a first TCI state that is a TCI state associated with a synchronization signal block selected by the UE during an initial access procedure, and
a second TCI state that is one of a TCI state with a highest TCI state identifier (ID) among the configured TCI states for the SFN CORESET or a TCI state with a lowest TCI state ID among the TCI states for the SFN CORESET.

15. The method of claim 13, wherein the two TCI states include a first TCI state associated with a synchronization signal block selected by the UE during an initial access procedure and a second TCI state associated with the synchronization signal block selected by the UE during the initial access procedure.

16. The method of claim 12, further comprising:
receiving an activation command that indicates a single TCI state to be activated, wherein determining the one or more TCI states for monitoring the SFN CORESET is based at least in part on a determination that the UE has received the activation command that indicates the single TCI state to be activated.

17. The method of claim 16, wherein the configuration indicates a plurality of configured TCI states for the SFN CORESET, and the one or more TCI states include:
a first TCI state that is the single TCI state indicated in the activation command, and
a second TCI state that is one of a TCI state with a highest TCI state identifier (ID) among the configured TCI states for the SFN CORESET or a TCI state with a lowest TCI state ID among the TCI states for the SFN CORESET.

18. The method of claim 16, wherein the one or more TCI states include one TCI state that is the single TCI state indicated in the activation command.

19. The method of claim 16, wherein the configuration indicates a single configured TCI state for the SFN CORESET, and the one or more TCI states include:
a first TCI state that is the single configured TCI state indicated in the configuration, and
a second TCI state that is the single TCI state indicated in the activation command.

20. The method of claim 12, wherein the single TCI state is a TCI state associated with a synchronization signal block selected by the UE during an initial access procedure.

21. The method of claim 12, wherein the configuration indicates multiple configured TCI states for the SFN CORESET, and the single TCI state is one of a TCI state with a highest TCI state identifier (ID) among the configured TCI states for the SFN CORESET or a TCI state with a lowest TCI state ID among the TCI states for the SFN CORESET.

22. The method of claim 12, further comprising:
receiving an activation command that indicates a single TCI state to be activated for the SFN CORESET; and
ignoring the activation command that indicates the single TCI state to be activated for the SFN CORESET.

23. A non-transitory computer-readable medium storing one or more instructions for wireless communication, the one or more instructions comprising:
one or more instructions that, when executed by one or more processors of a user equipment (UE), cause the one or more processors to:
receive, from a base station, a configuration of a control resource set (CORESET), wherein the configuration includes an indication that the CORESET is a single frequency network (SFN) CORESET;
determine one or more transmission configuration indicator (TCI) states for monitoring the SFN CORESET based at least in part on a determination that the UE has not received an activation command that indicates multiple TCI states to be activated wherein determining the one or more TCI states for monitoring the SFN CORESET comprises determining a single TCI state for monitoring the SFN CORESET, based at least in part on a determination that the UE has not received an activation command that indicates any TCI states to be activated; and receive a physical downlink control channel (PDCCH) communication using the one or more TCI states determined for monitoring the SFN CORESET.

24. The non-transitory computer-readable medium of claim 23, wherein the one or more instructions, to determine the one or more TCI states for monitoring the SFN CORESET, are further executable to cause the one or more processors to:

determine a single TCI state for monitoring the SFN CORESET, based at least in part on a determination that the UE has not received an activation command that indicates any TCI states to be activated.

25. The non-transitory computer-readable medium of claim 23, wherein the one or more instructions, to determine the one or more TCI states for monitoring the SFN CORESET, are further executable to cause the one or more processors to:

determine two TCI states for monitoring the SFN CORESET, based at least in part on a determination that the UE has not received an activation command that indicates any TCI states to be activated.

26. The non-transitory computer-readable medium of claim 23, wherein the one or more instructions are further executable to cause the one or more processors to:

receive an activation command that indicates a single TCI state to be activated, wherein determining the one or more TCI states for monitoring the SFN CORESET is based at least in part on a determination that the UE has received the activation command that indicates the single TCI state to be activated.

27. The non-transitory computer-readable medium of claim 26, wherein the configuration indicates a plurality of configured TCI states for the SFN CORESET, and the one or more TCI states include:

a first TCI state that is the single TCI state indicated in the activation command, and a second TCI state that is one of a TCI state with a highest TCI state identifier (ID) among the configured TCI states for the SFN CORESET or a TCI state with a lowest TCI state ID among the TCI states for the SFN CORESET.

28. An apparatus for wireless communication at a user equipment (UE), comprising:

means for receiving, from a base station, a configuration of a control resource set (CORESET), wherein the configuration includes an indication that the CORESET is a single frequency network (SFN) CORESET;

means for determining one or more transmission configuration indicator (TCI) states for monitoring the SFN CORESET based at least in part on a determination that the UE has not received an activation command that indicates multiple TCI states to be activated wherein determining the one or more TCI states for monitoring the SFN CORESET comprises determining a single TCI state for monitoring the SFN CORESET, based at least in part on a determination that the UE has not received an activation command that indicates any TCI states to be activated; and means for receiving a physical downlink control channel (PDCCH) communication using the one or more TCI states determined for monitoring the SFN CORESET.

* * * * *